United States Patent
Ouimette et al.

(10) Patent No.: US 9,472,188 B1
(45) Date of Patent: Oct. 18, 2016

(54) PREDICTING OUTCOMES FOR EVENTS BASED ON VOICE CHARACTERISTICS AND CONTENT OF A CONTACT CENTER COMMUNICATION

(71) Applicant: Noble Systems Corporation, Atlanta, GA (US)

(72) Inventors: Jason P. Ouimette, Atlanta, GA (US); Christopher S. Haggerty, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 413 days.

(21) Appl. No.: 14/080,925

(22) Filed: Nov. 15, 2013

(51) Int. Cl.
*G10L 15/08* (2006.01)

(52) U.S. Cl.
CPC .................................. *G10L 15/08* (2013.01)

(58) Field of Classification Search
CPC ............................... G10L 17/04; G10L 25/00
USPC ........................................................ 704/244
See application file for complete search history.

(56) References Cited

U.S. PATENT DOCUMENTS

| | | | |
|---|---|---|---|
| 6,658,395 B1 | 12/2003 | Barnhill | |
| 7,668,718 B2 * | 2/2010 | Kahn | G10L 15/063 704/270 |
| 7,716,048 B2 * | 5/2010 | Pereg | G10L 25/00 379/88.01 |
| 8,095,483 B2 | 1/2012 | Weston et al. | |
| 8,396,732 B1 | 3/2013 | Nies et al. | |
| 8,571,859 B1 * | 10/2013 | Aleksic | G10L 15/07 704/231 |
| 2004/0210442 A1 * | 10/2004 | Glynn | G06Q 10/087 704/275 |
| 2005/0182628 A1 * | 8/2005 | Choi | G10L 15/08 704/252 |
| 2006/0149558 A1 * | 7/2006 | Kahn | G10L 15/063 704/278 |
| 2008/0243728 A1 | 10/2008 | Li et al. | |
| 2013/0246064 A1 * | 9/2013 | Wasserblat | G10L 25/78 704/244 |
| 2014/0140497 A1 | 5/2014 | Ripa et al. | |

OTHER PUBLICATIONS

"Speech Emotion Recognition Using Support Vector Machine," Chavhan, Yashpalsing, Dhore, M.L., and Yesaware, Pallavi, International Journal of Computer Applications, vol. 1—No. 20, 2010.
"Speech-Based Emotion Classification Using Multiclass SVM with Hybrid Kernel and Thresholding Fusion," Yang, N., Muraleedhara, R., Kohl, J., Demirkol, I., Heinzelman, W., Sturge-Apple, M., Presented at 2012 IEEE Workshop on Spoken Language Technology.
"Support Vector Machines for Classification," Fradkin, Dmitriy and Muchnik, Ilya, DIMACS Series in Discrete Mathematics and Theoretical Computer Science, 2007.
"Text Categorization with Support Vector Machines. How to Represent Texts in Input Space?," Leopold, Edda and Kindermann, Jorg, Machine Learning, 46, pp. 423-444, 2002.
"Tutorial on Support Vector Machine (SVM)," Jakkula, Vikramaditya, http://www.ccs.neu.edu/course/cs5100f11/resources/jakkula.pdf, 2011.

(Continued)

*Primary Examiner* — Michael N Opsasnick

(57) ABSTRACT

Various embodiments of the invention provide methods, systems, and computer-program products for predicting an outcome for an event of interest associated with a contact center communication. That is to say, various embodiments of the invention involve predicting an outcome for an event of interest associated with a party involved in a contact center communication based on characteristics and content of the communication conducted with the party by utilizing one or more classifier models.

21 Claims, 12 Drawing Sheets

(56) References Cited

OTHER PUBLICATIONS

"A Users Guide to Support Vector Machines," Ben-Hur, Asa and Weston, Jason, http://pyml.sourceforge.net/doc/howto.pdf, 2010.
"Application of Majority Voting to Pattern Recoginition: An Analysis of Its Behavior and Performance," Lam, Louisa and Suen, Ching Y., IEEE Transactions on Systems, Man, and Cybernetics—Part A: Systems and Humans, vol. 27, No. 5, Sep. 1997.
"Class-Specific Feature Selection for One-Against-All Multiclass SVMs," de Lannoy, Gael, Francois, Damien, and Verleysen, Michel, ESANN 2011 Proceedings, European Symposium on Artificial Neural Networks, Computational Intelligence and Machine Learning, Ap.
"Discriminative Keyword Selection Using Support Vector Machines," Campbell, W.M. and Richardson, F.S., in Advances in Neural Information Processing Systems, vol. 20, 2007.
"Emotional Expression Recognition Using Support Vector Machines," Dumas, Melanie, http://cseweb.ucsd.edu/users/elkan/254spring01/mdumasrep.pdf, 2001.
Feature Extraction and Dimensionality Reduction Algorithms and their Applications in Vowel Recognition, Wang, Xuechuan and Paliwal, Kuldip K., Pattern Recognition, The Journal of the Pattern Recognition Society 36, 2003.
"A Hybrid Support Vector Machine Ensemble Model for Credit Scoring," Ghodselahi, Ahmad, International Journal of Computer Applications, vol. 17—No. 5, Mar. 2011.
"Determination of Optimal SVM Parameters by Using GA/PSO," Ren, Yuan and Bai, Guangchen, Journal of Computers, vol. 5, No. 8, Aug. 2010.
"Recognition of Emotion from Speech: A Review," Ramakrishnan, S., International Journal of Speech Technology, Jun. 2012, vol. 15, Issue 2, pp. 99-117.
"One-Against-All Multi-Class SVM Classification Using Reliability Measures," Liu, Yi and Zheng, Yuan F., Neural Networks, 2005. IJCNN 05. Proceedings. 2005 IEEE International Joint Conference on , vol. 2, No., pp. 849,854 vol. 2, Jul. 31-Aug. 4, 2005.

\* cited by examiner

PREDICTING OUTCOMES FOR EVENTS BASED ON VOICE CHARACTERISTICS AND CONTENT OF A CONTACT CENTER COMMUNICATION

BACKGROUND

The advantages an entity can realize if the entity could accurately predict outcomes for various communications conducted with parties are tremendous. For instance, if a contact center could accurately predict whether a payment will actually be received from a party after contacting the party to discuss a collections matter could help the contact center to plan accordingly. For example, if the contact center could accurately predict that it will receive a payment from the party, then the contact center would be able to safely shift its energy and resources to other collection matters with the knowledge that it will receive a payment from the party. While in another instance, if an employer could accurately predict that an employee will call off work the following day after receiving a call from the employee calling off work due to illness for the current day, then the employer could take action to ensure that a replacement is available for the following day. There are countless other examples in which advantages may be realized by an entity having the capability to accurately predict outcomes for various communications. Accordingly, it is with respect to this consideration and others that the disclosure herein is presented.

BRIEF SUMMARY

In general, embodiments of the present invention provide computer-program products, methods, systems, apparatus, and computing entities for predicting an outcome for an event of interest associated with a party based on characteristics and content of a spoken communication conducted with the party while discussing the event of interest. That is to say, various embodiments of the invention involve predicting an outcome for an event of interest associated with a party based on characteristics and content of a spoken communication conducted with the party by utilizing one or more learning machines such as classifier models that include, for example, decision trees, artificial neural networks, and support vector machines.

For instance, in particular embodiments, a voice sample of a party is received in which the party is speaking about an event of interest. From this voice sample, voice characteristics are extracted and applied to a first classifier model to provide a first predicted outcome for the event of interest associated with the party. Depending on the embodiment, the voice characteristics may comprise one or more of accent shape, average pitch, contour slope, final lowering, pitch range, speech rate, stress frequency, breathiness, brilliance, loudness, pause discontinuity, and pitch discontinuity. In addition, analytics are performed on the voice sample to detect a set of words being spoken by the party in the voice sample and a second classifier model is applied to the set of words to provide a second predicted outcome for the event of interest associated with the party.

Accordingly, a determination is made as to whether the first predicted outcome and the second predicted outcome match. That is, a determination is made as to whether the first predicted outcome is the same as the second predicted outcome. If so, then the outcome for the event of interest associated with the party is predicted to be the first predicted outcome. However, if the two predicted outcomes are not the same, then the outcome for the event of interest associated with the party is determined to be (1) the first predicted outcome if the first classifier model is historically more accurate than the second classifier model at providing predicted outcomes or (2) the second predicted outcome if the second classifier model is historically more accurate than the first classifier model at providing predicted outcomes.

Depending on the event of interest, the event may have more than two possible outcomes. Thus, in particular embodiments, the first classifier model is one of a first set of classifier models comprising a classifier model for predicting each possible outcome based on the voice characteristics and the second classifier model is one of a second set of classifier models comprising a classifier model for predicting each possible outcome based on the set of words being spoken by the party. In addition, in particular embodiments, extracting the voice characteristics from the voice sample may involve normalizing the voice sample to eliminate speaker and recording variability and then applying one or more digital signal processing methods to extract the voice characteristics. Further, once analytics have been performed on the voice sample to detect the set of words being spoken by the party, a lemmatization may be performed on the set of words in particular embodiments to map inflected words to their lemma form and common words found in the set of words that solely fulfill a grammatical function as opposed to a content function that carries meaning may be eliminated from the set of words. Further, a frequency of occurrence of each remaining word in the set of words following the elimination may be determined so that they can be provided as input to the second classifier model. Finally, in particular embodiments, one or more actions may be initiated based on the outcome predicted for the event of interest. Such as, for example, setting up a follow-up communication, such as a phone call or email, to the party.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
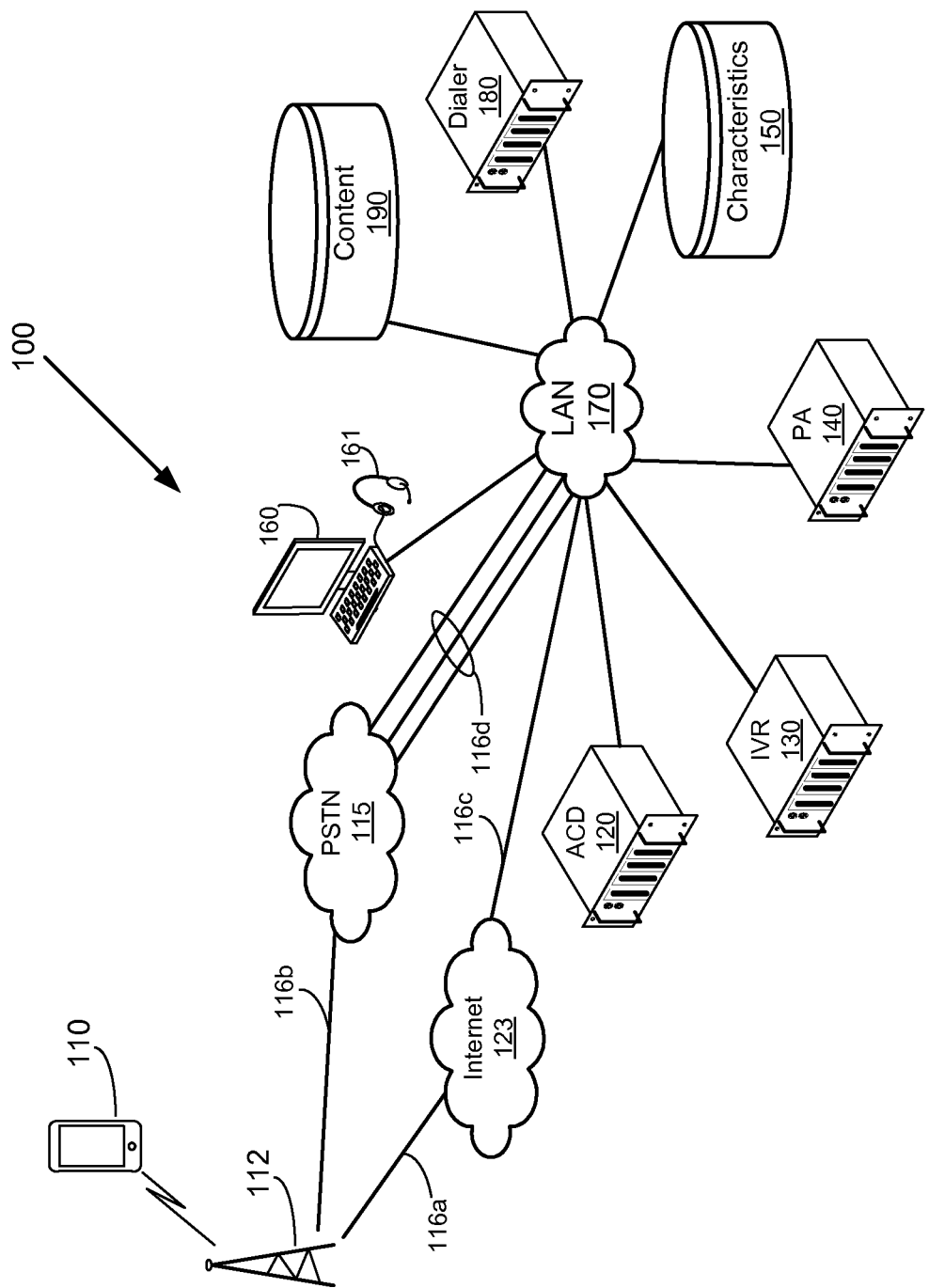
FIG. 1 shows an embodiment of an architecture that may be employed to predict the outcome for an event of interest associated with a party in accordance with various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

General Overview

Various embodiments of the invention are concerned with predicting an outcome for an event of interest related to an individual based on the characteristics and content of a spoken communication conducted with the individual while discussing the event of interest. For example, a call center agent may place a call to a party to discuss a past due amount owed by the party on a car loan (e.g., a late monthly payment on the call loan). During the call with the party, the agent and party discuss whether he is able to submit the monthly payment and accordingly, the party may express that he can or cannot submit the payment or he may make one or more other statements with respect to submitting the monthly payment. For example, the party may comment that he will "get a check in the mail first thing Tuesday" after he gets paid on Monday.

At this point, the call center (and/or loan originator) may be interested in determining from the phone call whether the party actually plans to submit the payment. Such information may help the call center (and/or loan originator) to determine what course of action to follow as a result of the phone call. For example, if call center determines that the likelihood of the party actually sending a check on Tuesday is high, then the call center may avoid following-up with the party over the next week or two and concentrate its efforts on other past due accounts. Such action may help the call center to act in a more efficient manner. However, in contrast, if the call center determines that the likelihood of the party actually sending a check on Tuesday is low (regardless of the fact the party indicated he would do so during the call), then the call center may follow-up by placing another call to the party a few days after Tuesday to inquire as to the party's progress with submitting the late payment. Therefore, by predicting the party is not likely to actually send the check on Tuesday, the call center can appropriately plan to follow-up with the party in a short time period to help increase its chance of actually collecting the late payment.

Accordingly, having capabilities to accurately predict an outcome for an event of interest related to an individual (a party) based on the characteristics and content of a spoken communication with the individual to discuss the event can be very advantageous in many situations, including situations outside of the debt collection context. For example, such capabilities can be very advantageous with respect to predicting whether a contacted party is likely to react favorably to a follow-up call about purchasing a product after receiving an initial contact to discuss the product. Such a prediction can help to drive an outbound calling campaign's efforts so that agents are placing more calls that are likely to result in sales of the product. Those of ordinary skill in the art can envision numerous situations in which such capabilities can be quite advantageous.

Furthermore, having such capabilities automated or partially automated can be quite advantageous in many situations. For instance, returning to the context of a call center, the ability to perform a prediction for an event of interest involving a party in real-time or near real-time can help the call center better plan its course of action with respect to the party and to implement a plan of action in a timely fashion. For example, if the call center can automatically predict that a party is likely to perform a favorable outcome after receiving an initial phone call (e.g., make a purchase of a product or give a donation to a local charity), then the call center can follow-up with the party with another phone call in a more timely fashion to help ensure the favorable outcome occurs.

Thus, in various embodiments of the invention, computers are utilized to automate such predictive capabilities. That is say, in various embodiments, one or more computers are configured to automate the process of predicting outcomes for events of interest involving individuals (parties) based on characteristics and content of spoken communications conducted with the individuals. In the context of a call center, such computers may be configured to bridge onto a communication being conducted between an agent and a party so that the computers may gather information (characteristics and content) in real-time or near real-time from the communication and predict an outcome. While in other instances, the computers may gather information and provide a prediction once the communication has concluded between the agent and the party.

Accordingly, the computers make use of machine learning in various embodiments to achieve such predictive capabilities. Generally speaking, machine learning is concerned with the construction and study of systems (e.g., computers) that can learn from data. The core of machine learning deals with representation and generalization. That is to say, a core objective of a learning machine is to generalize from its experience. Generalization is the ability of the learning machine to perform accurately on new, unseen instances after having experienced a training data set comprising instances with known outcomes. Thus, a learning machine focuses on providing predictions based on known properties learned from a training data set.

Several types of learning machines (machine learning algorithms) exist and may be applicable with respect to embodiments of the invention. For instance, a decision tree uses a tree-like graph or model of decisions (flowchart-like structure) to map observations about an item to conclusions about the item's target value. In general, the flowchart-like structure is made up of internal nodes representing tests on attributes and branches flowing from the nodes representing outcomes to these tests. The internal nodes and branches eventually lead to leaf nodes representing class labels. Accordingly, a path from a root to a leaf represents classification rules.

Another type of learning machine is an artificial neural network. An artificial neural network is a learning algorithm inspired by the structure and functional aspects of biological neural networks. Computations are structured in terms of an interconnected group of artificial neurons, processing information using a connectionist approach to computation. Artificial neural networks are typically used to model complex relationships between inputs and outputs to find patterns in data or to capture a statistical structure in an unknown joint probability distribution between observed variables.

There are countless other types of learning machines, such as Bayesian networks, clustering, and reinforcement learning to name a few, that one of ordinary skill in the art may make use of with respect to various embodiments of the invention. However, with respect to the embodiments of the invention described below, the type of learning machine utilized is a support vector machine (SVM).

SVMs are generally a set of related supervised learning methods that can be used for classification purposes. That is to say, SVMs are generally used to classify an instance into one class or another. Given a set of training examples, each marked as belonging to one of two categories (e.g., classes), a SVM training algorithm builds a model that predicts whether a new sample falls into one of the two categories. This model is a representation of the examples as points in space (a hyper plane), mapped so that the examples of the separate categories are divided by a clear gap that is as wide as possible. Accordingly, new examples can be mapped into the same space and predicted to belong to either category based on which side of the gap they fall on.

With that said, it is often the case that the data for a particular classification problem is not linear and therefore, a separating hyper plane cannot be found to separate the training examples. Accordingly, in these instances, a kernel function may be used to non-linearly map the data to a high-dimensional space that is linearly separable. In essence, this kernel function represents a dot product of the data after performing a non-linear mapping on the data. That is to say, a suitable function that corresponds to a dot product of some non-linear mapping on the data (a kernel function) is used instead of the dot product itself. In many instances, the appropriate kernel function to use for a particular classification problem is selected via trial and error.

Accordingly, various embodiments of invention involve developing SVM models for predicting an outcome (e.g., classification) of an event of interest. For instance, returning to the monthly payment collection example provided above, SVM models are developed to predict whether a party who has been contacted about missing a monthly payment on an auto loan will actually submit a payment after indicating he would do so during the telephone call. As is described in greater detail below, a first set of one or more SVM models are developed using past telephone calls involving similar subject matter in which characteristics (e.g., prosodic features) are extracted from the past telephone calls to train the one or more SVM models to predict whether a party will actually submit a payment after indicating he would do so during a telephone call. Then, a second set of one or more additional SVM models are also developed using the past telephone calls. However, for these additional SVM models, the content (e.g., the words spoken by the individual) of the past telephone calls is used to train the one or more additional SVM models to predict whether a party will actually submit a payment after indicating he would do so during a telephone call.

The logic behind developing the first set of SVM models for such a purpose is because the characteristics reflected in the party's voice while speaking on the telephone call can impart the party's true intention with respect to submitting the payment for the overdue amount. That is, for instance, the party's voice may demonstrate different characteristics when the individual is being truthful about submitting the payment as opposed to when the individual is being untruthful about submitting the payment. Likewise, the logic behind developing the second set of SVM models is because the words spoken by the party during the telephone call can also impart the individual's true intent. Although the party may express during the telephone call that he will submit the payment, the party may make other statements during the telephone call that would indicate otherwise. Therefore, the second set of SVM models is predicated on the words spoken outside the party's affirmation of payment, which can further indicate whether the individual intends to submit the payment.

Once the sets of SVM models have been developed and the accuracy of the models is acceptable, the sets of SVM models may then be applied to present telephone calls made to parties who are past due on loan payments (e.g., calls made for collection purposes). Therefore, when a collection call is placed to a party, the party's voice may be analyzed during the telephone call, or may be recorded and analyzed after the call has completed, to predict whether the party will actually submit payment for an overdue amount on a loan. As described in further detail below, one or more characteristics of the party's voice are extracted from the party's voice data (audio) and are used as input into the first set of SVM models to predict whether the party will actually submit payment. That is say, the extracted characteristics of the party's voice data are used as input into the first set of SVM models to classify the party into "yes, the party will actually submit payment" or "no, the party will not actually submit payment." Likewise, the words spoken by the party during the telephone call are used as input in the second set of SVM models to predict whether the party will actually submit payment.

Accordingly, two predictions are provided by the two sets of SVM models with respect to whether the party will actually submit payment. The first prediction is based on the characteristics of the party's voice and the second predication is based on the content of what the party said during the telephone call. If the two predictions are the same (e.g., both predictions indicate the party will actually submit payment), then the prediction is relied on and the appropriate action(s)

for this prediction are taken by the call center. However, if the two predictions are not the same, as is discussed further below, in various embodiments, the "more reliable" prediction is used to control the call center's action(s). For instance, in particular embodiments, the reliability of each prediction is monitored on a historical basis and the historically more reliable prediction is used to control the call center's action(s).

It is important to note that the process described above of predicting an outcome for an event of interest related to an individual based on the characteristics and content of a spoken communication conducted with the individual can be applied to other environments other than a call center. Accordingly, various embodiments of invention may be applicable in many different environments that involve spoken communications. For instance, a business may institute an automated call-in system for employees who need to report off from work and an employee calls the system and reports off from work for the day because she is feeling ill. In this instance, the call may be recorded and the sets of SVM models may be used to predict whether the employee may report off from work again the following day or to predict whether the employee was being truthful when she indicated she was too ill to come to work. Therefore, although embodiments of the invention are described below with respect to a call center environment, such descriptions should not be construed to limit the embodiments of the invention to only a call center environment.

Finally, it is noted that various embodiments of the invention may be used in instances involving more than two outcomes (more than two classes). In general, a single SVM model provides a prediction (a selection) for a particular instance of being in a first class or a second class. However, a plurality of SVM models may be used together to address instances involving more than two classes. For instance, a one-against-all approach or a one-against-one approach may be used. For these two approaches, multiple binary SVM models are trained separately and their predictions are then combined.

In the case of a one-against-all approach, a SVM model is constructed for each class and the SVM model for a particular class predicts whether an instance is a member of the particular class or is a member of the remaining classes. For example, the outcomes for a particular event of interest may be A, B, and C. Thus, in this example, a first SVM model is constructed to predict whether a particular instance of the event is outcome A or is outcome B or C. Likewise, a second SVM model is constructed to predict whether the particular instance of the event is outcome B or is outcome A or C, and so forth. For this particular approach, the particular instance is assigned to the outcome with the SVM model that provides the highest score among all the SVM models (the largest value in the decision function).

In the case of a one-against-one approach, a SVM model is constructed for each pair of classes. For instance, in the example from above, SVM models would be constructed for "A v. B," "A v. C," and "B v. C." For this approach, each SVM model is given a vote with respect to classifying a particular instance of the event, and the class that receives the highest number of votes is selected as the class (outcome) for the particular instance of the event.

Exemplary Architecture for Call Center

As mentioned above, although embodiments of the invention may be used in a variety of different environments, various embodiments of the invention are described in detail below with respect to using such embodiments in a call center environment. Accordingly, FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. However, for the purposes of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types such as, for example, a conventional analog telephone (not shown) or smart device 110 such as a mobile phone, tablet, or other device that wirelessly communicates with a mobile service provider ("MSP") 112. A calling party may originate a call from such a device connected to a public switched telephone network ("PSTN") 115 using an analog plain old telephone service ("POTS") line (not shown), an integrated services digital network ("ISDN") interface 116*b*, or other types of interfaces that are well known to those skilled in the art. The calls may be routed by the PSTN 115 and may comprise various types of facilities 116*d*, including, but not limited to: T1 trunks, SONET based fiber optic networks, ATM networks, etc. Various types of routers, switches, bridges, gateways, and other types of equipment may be involved in the processing of the calls. In particular embodiments, the MSP 112 may use a facility 116*a* to an Internet provider 123 and route calls as packetized voice, referred to herein as voice-over-IP ("VoIP") using Internet-based protocols. For convenience, unless indicated otherwise, the term "trunk" refers to any type of facility 116*c*, 116*d* providing voice calls to, or from, the call center, regardless of the type of protocol or technology used. Specifically, a "trunk" is not limited to time-division multiplexing ("TDM") technology.

Although not shown in FIG. 1, inbound voice calls may also originate from a calling party employing a so-called "IP phone," "VoIP phone," or "soft phone." In one embodiment, this device may comprise a computing device, such as a laptop, computing tablet, or other electronic device, which interfaces with a headphone/microphone combination, also referred to as a "headset." An IP phone may use a digital voice control protocol and may process packetized voice data according to various Internet based voice protocols, such as session initiation protocol ("SIP"). Those skilled in the art will recognize that a variety of protocols and facilities may be used to convey voice calls.

The term "telephone call" as used herein is generally synonymous with a "voice call" unless indicated otherwise. The term "call" as used herein may mean an active instance of two-way communication, an attempt to establish two-way communication, or a portion of the two-way communication. For example, a user can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at or routed to an automatic call distributor ("ACD") 120. In particular embodiments, the ACD 120 may be a specialized switch for receiving and routing inbound calls under various conditions. Further, the ACD 120 may be embodied as a dedicated form of equipment readily available from various manufacturers, or the ACD 120 may be a so-called "soft switch" comprising a suitable programming module executed by a processing device to perform the necessary functions. The ACD 120 may route an incoming call over call center facilities to an available agent. Depending on the embodiment, the facilities may be any suitable technology for conveying the call, including but not limited to a local area network ("LAN") 170, wide area network ("WAN"), ISDN, or conventional TDM circuits. In addition, the facilities may be the same or different from the facilities used to transport the call to the ACD 120.

The physical area at which an agent sits is often referred to as an agent "position" and these positions are often grouped into clusters managed by a supervisor, who may monitor calls and the agents' productivity. An agent typically uses a computing device 160, such as a computer, and a voice device 161. The combination of computing device 160 and voice device 161 may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing the call to the voice device 161 at the agent's position. Similarly, "routing the call to the agent" means routing a call to the appropriate equipment at an agent's position.

Depending on the embodiment, an agent may make use of a number of different voice devices 161. For instance, in particular embodiments, the voice device 161 used by the agent may be a soft phone device exemplified by a headset connected to the computer 160. The soft phone device may be a virtual telephone implemented in part by an application program executing on the computer 160. Thus, use of the term "phone" is intended to encompass all these types of voice devices 161 used by agents, unless indicated otherwise.

Agents typically log onto their workstations prior to handling calls. This allows the call center to know which agents are available for handling calls. In particular embodiments, the ACD 120 may also maintain data of an agent's skill level that may be used to route a specific call to the agent or group of agents having the same skill level. In particular instances, if a suitable agent is not available to handle a call, the ACD 120 may queue the call for the next available agent. As can be expected, various algorithms may be employed to process calls in an efficient manner.

In various embodiments, the ACD 120 may place a call in a queue if there are no suitable agents available, and/or it may route the call to an interactive voice response system (e.g., server) ("IVR") 130 to play voice prompts. In particular embodiments, these prompts may be in a menu type structure and the IVR 130 may collect and analyze responses from the party in the form of dual-tone multiple frequency ("DMTF") tones and/or speech. In addition, the IVR 130 may be used to further identify the purpose of the call, such as, for example, prompting the party to enter account information or otherwise obtain information used to service the call. Further, in particular embodiments, the IVR 130 may interact with other components, such as one or more data stores to retrieve or provide information for processing the call.

Depending on the embodiment, the interaction between the ACD 120, IVR 130, agent computer 160, as well as other components, may involve using some type of facilities such as a local area network ("LAN") 170. However, other configurations are possible, such as, but not limited to, using a wide area network, wireless network, router, bridge, direct point-to-point links, etc.

In addition to receiving inbound communications, including, for example, voice calls, emails, text messages, and facsimiles, the call center may also originate communications to a called party, referred to herein as "outbound" communications. In some embodiments, a call center may employ a dialer 180, such as a predictive dialer, to originate outbound calls at a rate designed to meet various criteria. Similar to the other components within the call center architecture 100, depending on the embodiment, the dialer 180 may comprise one or more software modules executing on a processing device hardware platform.

In various embodiments, the dialer 180 is typically configured to dial a list of telephone numbers to initiate outbound calls, which can be accomplished by instructing the ACD 120 to originate the calls. Thus, in some embodiments, the ACD 120 may include functionality for originating calls, and if so, this functionality may be referred to as a private automatic branch exchange ("PBX" or "PABX"). In other embodiments (not shown), the dialer 180 may directly interface with voice trunks using facilities 116c, 116d to the PSTN 115 and/or Internet providers 123 for originating calls. After the calls are originated, a transfer operation by the ACD 120 (or dialer 180) may connect the call with an agent or a queue, or in some instances the IVR 130. In instances in which the call is placed in a queue, announcements or music may be provided to the party. In various embodiments, the dialer 180 may make use of one or more algorithms to determine how and when to dial a list of numbers so as to minimize the likelihood of a called party being placed in a queue while maintaining target agent utilization.

Finally, in various embodiments, the call center architecture 100 may include one or more other components such as a predictive analytics ("PA") server 140 to perform various other functions as are detailed below. For instance, in particular embodiments, the predictive analytics server 140 may monitor (in real-time or not) communications conducted between agents and outside parties and perform analytics on these communications to extract information from the communications. Further, the predictive analytics server 140 may interact with one or more data stores to retrieve and/or to store information. For instance, in particular embodiments, the predictive analytics server 140 interacts with one or more data stores 150 of characteristics extracted from spoken communications as well as one or more data stores 190 of content collected from spoken communications. As discussed below, extracted/collected information for a communication may be provided as input into classifier models in order to predict an outcome for an event of interest related to a party involved in the communication. For example, the call may involve a call center agent contacting an individual about payment on a past due debt (e.g., car loan). In this instance, information may be extracted and/or collected from the individual's audio portion of the call and used as input into classifier models to predict whether the individual is actually going to submit a payment on the past due debt after indicating during the call that he plans to do so.

Further, in particular embodiments, the predictive analytics server 140 may perform voice (e.g., speech) analytics on communications to recognize words spoken during the telephone calls. In these instances, a number of different analytics approaches may be employed. For example, the predictive analytics server 140 may make use of one or more of a phonetics approach, large-vocabulary continuous speech recognition (LVCSR) approach, and/or direct phrase recognition approach in performing voice analytics on communications. In addition, depending on the embodiment, the predictive analytics server 140 may be further configured to perform one or more functions with respect to the set of words detected from performing analytics on a communication. For instance, as detailed further below, in particular embodiments, the predictive analytics server 140 may also be configured to use analytics results as input into the classifier models.

Finally, it is noted that in particular embodiments, one or more capabilities of the predictive analytics server 140 may instead be incorporated into one or more other components found in the call center architecture 100. For instance, in particular embodiments, one or more capabilities of the predictive analytics server 140 may be incorporated into the ACD 120 and/or dialer 180. In addition, in particular embodiments, one or more capabilities of the predictive analytics server 140 may be performed by a third-party provider as a service to the call center. For example, in one embodiment, a third-party provider may perform voice analytics on the communications for the call center and provide the analytics results to the call center. In turn, the predictive analytics server 140 may process the voice analytics results received from the third-party provider by using the results as input into the classifier models.

Although a number of the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 120, IVR 130, dialer 180, predictive analytics server 140, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Preprocessing Voice Characteristics Module

Figure 2A:
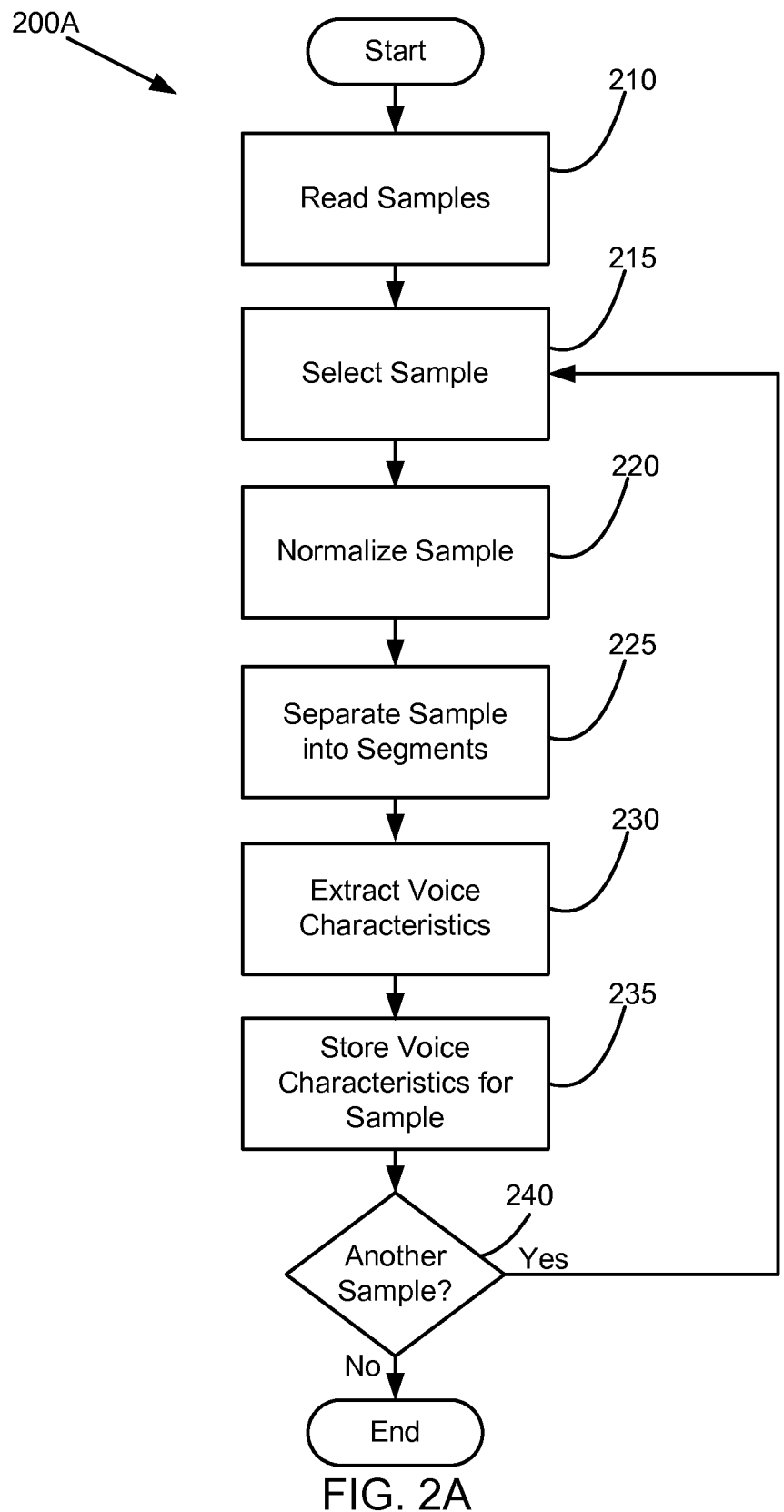
FIG. 2A illustrates an embodiment of a process flow for preprocessing voice samples for voice characteristic features in accordance with various technologies and concepts disclosed herein.

Turning now to FIG. 2A, additional details are provided regarding a process flow 200A that may be used in preprocessing voice samples for voice characteristic features according to various embodiments of the invention. For purposes of explaining the process flow 200A, the description will focus on an example involving a call center conducting an outbound calling campaign on behalf of a charity to solicit donations for an animal shelter. With respect to the outbound campaign, the call center and charity are interested in determining whether and how to follow-up with contacted parties who indicate they not interested at the current time of contact in donating to the animal shelter. More specifically, the call center and charity are interested in predicting whether: (1) a follow-up call to a contacted party will lead to a donation; (2) a follow-up email to the contacted party will lead to a donation; or (3) neither one of the actions will lead to a donation. Such a prediction for each call in which the contacted party indicates he is not interested at the current time in donating to the animal shelter can help the call center and charity to more efficiently follow-up with contacted parties to lead to more donations made to the animal shelter.

Looking at FIG. 2A, this figure is a flow diagram showing a preprocessing voice characteristics (PVC) module for performing such functionality according to various embodiments of the invention. For example, the process flow 200A shown in FIG. 2A may correspond to operations carried out by a processor in a component, such as the predictive analytics server 140 described above with respect to the call center architecture 100, as it executes the PVC module stored in the component's volatile and/or nonvolatile memory. Thus, turning now to FIG. 2A, the PVC module reads a number of voice samples in Operation 210. Depending on the embodiment, these voice samples may be sourced by any number of different resources. For instance, in one embodiment, the voice samples may be taken from past outbound calling campaigns conducted by the call center for the same charity and/or for a number of other charities. However, generally speaking, the voice samples typically entail past calls involving similar circumstances as to the calls for which a prediction is to be made. In other words, the voice samples typically entail past calls made for the purpose of soliciting donations for a charity in which the contacted party indicated that he was not interested at the current time in making a donation to the charity.

In addition, the voice samples include samples in which each of the interested outcomes occurred. Thus, for the example, the voice samples read by the PVC module include samples in which a follow-up call to the contacted party led to a donation, samples in which a follow-up email to the contacted party led to a donation, and samples in which neither one of the actions led to a donation. Further, the number of samples for each outcome is typically the same across all of the outcomes. That is to say, if the voice samples read by the PVC module include three hundred samples, then the number of samples for each of the three outcomes should be typically around one hundred samples. Finally, depending on the circumstances, the voice samples may include the contacted parties' audio portions of the calls only or both the call center agents' and contacted parties' audio portions of the calls. For example, in instances in which the call center agents' spoken words along with the called parties' spoken words help to increase the accuracy (e.g., confidence value) of predictions provided by a classifier model, then the agents' spoken words may also be included along with the contact parties' spoken works as input into the classifier model. However, typically, such instances in which this occurs are determined through trial and error. For example, if the accuracy of a classier model is unacceptable when based solely on portions of voice samples for contacted parties, then the portions of the voice samples for the call center agents may be included to attempt to increase the accuracy of the model.

Once the voice samples have been read, the PVC module selects a sample from the voice samples in Operation 215. At this point in various embodiments, the PVC module normalizes the sample in Operation 220. Typically, normalization is carried out on the sample to eliminate variability across the set of voice samples. For example, such variability may be due to noise that is contained within a recorded sample as a result of the background and/or "hiss" of recording equipment and/or the different recording settings for the recording equipment. Thus, in particular embodiments, the PVC module may normalize the sample to eliminate recording variability.

It should be noted that in particular embodiments, in order to carry out the normalization process for a particular voice sample one or more properties may need to be known with respect to a plurality of the voice samples. For example, the normalization process may involve normalizing the pitch contour of a particular voice sample with respect to all of the voice samples read by the PVC module. Thus, in this example, the PVC module may need to know the average pitch value across all of the voice samples before the module can normalize the pitch contour of the particular voice sample. Therefore, although specific operations with respect to obtaining the one or more needed properties for a plurality of the voice samples are not specifically illustrated in the process flow 200A shown in FIG. 2A, such operations (if needed) are understood to be incorporated within the Operation 220 for normalizing the sample.

Once the sample as been normalized, the PVC module separates the sample into segments in Operation 225. This may be referred to as "framing." For instance, in a particular embodiment, the PVC module separates the sample into sixty millisecond segments with ten millisecond time shifts. Since human speech typically consists of audible and inaudible segments, only the audible segments of the sample are analyzed for voice characteristics and the inaudible segments are ignored. Depending on the embodiments, an "audible" segment may be identified by the PVC module using a number of different criteria. For instance, in one embodiment, the PVC module determines a particular segment is an audible segment if a certain percentage of the segment's absolute amplitude is above a certain threshold. It should be noted that in particular instances, the voice samples may be converted from analog to digital format during or prior to separating the sample into segments if such a conversion is needed.

At this point, the PVC module applies one or more digital signal processing methods to extract voice characteristics from the audible segments in Operation 230. Although a number of different voice characteristics (prosodic features) may be extracted, such as pitch, intensity, speaking rate, and voice quality, particular embodiments of the invention concentrate on pitch and intensity, although it should be understood that in other embodiments other prosodic features may be used. This is because pitch and intensity have been shown to be correlated to the amount of energy required to express certain emotions. For instance, when a person is in a state of anger or displeasure, the resulting speech of the person is correspondingly loud, fast, and enunciated with strong high-frequency energy, a higher average pitch, and wider pitch range. Therefore, looking at the example of the outbound calling campaign involving contacting individuals about donating to the animal shelter, it may be advantageous to determine whether a contacted party is feeling anger or displeasure at being contacted about donating to the animal shelter. Such knowledge can help to predict whether a follow-up communication (call or email) may result in a donation.

For instance, as way of an example, the PVC module may be configured in various embodiments to extract the Mel Frequency Cepstral Coefficient (MFCC) from the audible segments. For this particular prosodic feature, the normalization process involves boosting the amount of energy in the high frequencies for the sample by using a filter. Accordingly, at this point, the sample is framed with a time length typically within the range of twenty to forty milliseconds. For this particular feature, framing enables the non-stationary speech signal to be segmented into quasi-stationary frames that enables Fourier Transformation of the speech signal. In particular instances, the individual segments are also windowed to minimize the signal discontinuities at the beginning and the end of each segment (frame).

Accordingly, a Fast Fourier Transform (FFT) algorithm is used to convert each segment of the sample from the time domain into the frequency domain and then a Mel filter bank is applied to each of the segments. The Mel filter bank includes a series of triangular band pass filters, which mimics the human auditory system. The filter bank is based on a non-linear frequency scale called the Mel scale and the filters are overlapped in such a way that the lower boundary of one filter is situated at the centre frequency of the previous filter and the upper boundary is situated at the centre frequency of the next filter. At this point, the logarithm is taken with respect to each segment to convert the multiplication of the magnitude in the Fourier transform into addition and the Discrete Cosine transform is used to orthogonalize the filter energy vectors. As a result, the information of each resulting filter energy vector is compacted into the first number of components and shortens the vector to the number of components. Depending on the embodiment, other voice characteristics may be extracted from the segments such as, for example, accent shape, average pitch, and pitch range.

At this point, the PVC module labels the extracted voice characteristics for the segments with the appropriate outcome (class) and stores them in Operation 235. That is to say, the PVC module associates the extracted voice characteristics with the one of the three possible outcomes that actually occurred for the sample that is currently being processed by the PVC module. Therefore, if the current sample is a sample of a call conducted with a contacted party that later donated to the animal shelter after receiving a follow-up call, the extracted voice characteristics for the current sample are labeled as such and are stored. Accordingly, the PVC module then determines whether another sample is present in the set of voice samples to process in Operation 240. If so, then the PVC module returns to Operation 215 and selects the next sample. As a result of the process flow 200A shown in FIG. 2A, the voice characteristics are extracted from the selected voice samples and are stored along with their corresponding outcome in storage. Accordingly, these stored voice characteristics may be used to train and test SVM models for each of the three outcomes.

Preprocessing Content Module

Figure 2B:
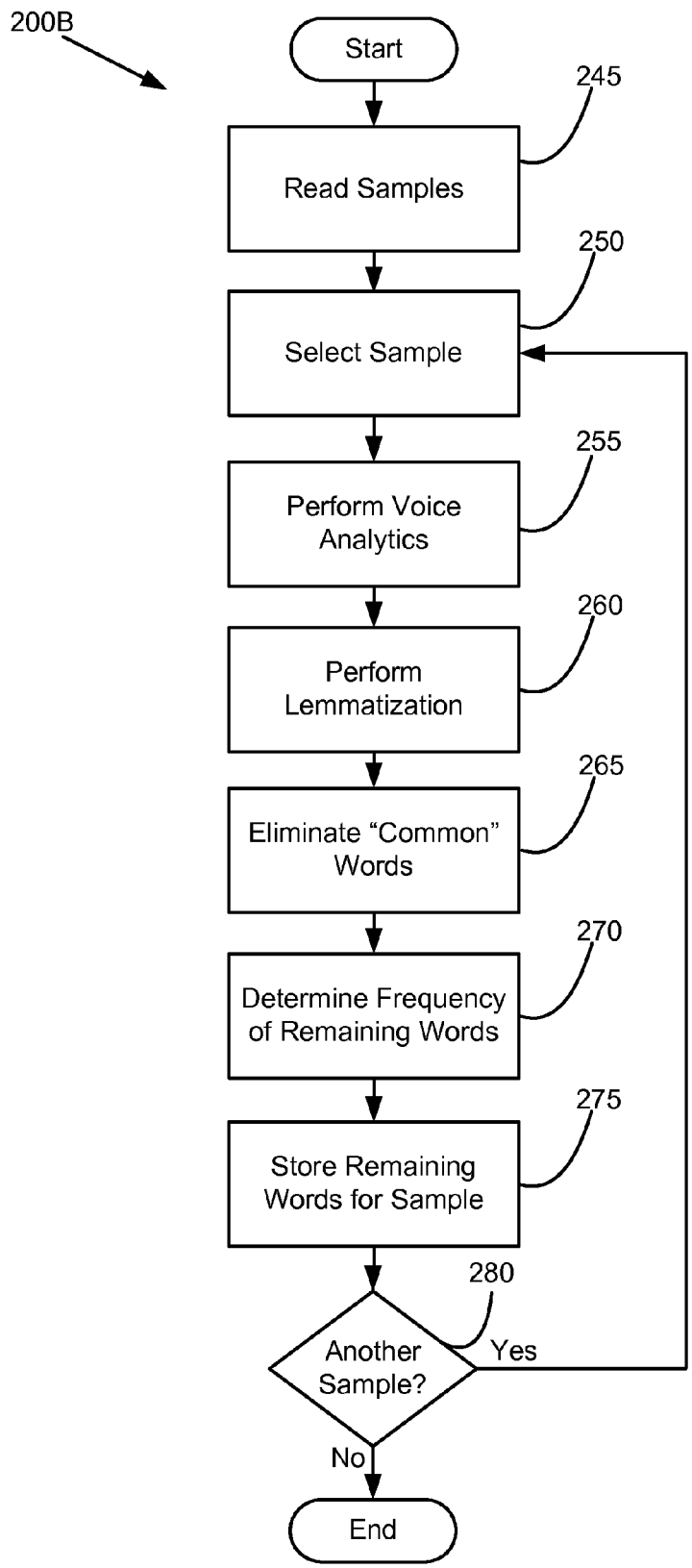
FIG. 2B illustrates an embodiments of a process flow for preprocessing voice samples for content features in accordance with various technologies and concepts disclosed herein.

In addition, to voice characteristics, the content of a call (e.g., the words spoken during the call) is also used in predicting the outcome or an event of interest. Accordingly, turning now to FIG. 2B, additional details are provided regarding a process flow 200B that may be used in preprocessing voice samples for content according to various embodiments of the invention. For purposes of explaining the process flow 200B, the description will focus on the example involving the call center conducting an outbound calling campaign on behalf of a charity to solicit donations for an animal shelter as previously described. FIG. 2B is a flow diagram showing a preprocessing content (PC) module for performing such functionality according to various embodiments of the invention. For example, the process flow 200B shown in FIG. 2B may correspond to operations carried out by a processor in a component, such as the predictive analytics server 140 described above with respect to the call center architecture 100, as it executes the PC module stored in the component's volatile and/or nonvolatile memory.

Thus, turning now to FIG. 2B, the PC module reads a number of voice samples in Operation 245. Similar with respect to the PVC module, these voice samples may be sourced by any number of different resources. However, generally speaking, the voice samples typically entail past calls involving similar circumstances as to the calls for which a prediction is to be made. In addition, the voice samples include samples in which each of the interested outcomes occurred. Thus, for the example, the voice samples read by the PC module include samples in which a follow-up call to the contacted party led to a donation, samples in which a follow-up email to the contacted party led to a donation, and samples in which neither one of the actions led to a donation. Further, the number of samples for each outcome is typically the same across all of the outcomes. Finally, depending on the circumstances, the voice samples may include the contacted parties' portions of the calls only or both the call center agents' and contacted parties' portions of the calls. In particular embodiments, the voice samples read by the PC module are essentially the same voice samples read by the PVC module. In other words, the two modules use the same set of voice samples.

Once the PC module has read the voice samples, similar to the PVC module, the PC module selects a sample in Operation 250. However, at this point, the PC module performs voice analytics on the sample to identify the words spoken in the sample in Operation 255. Accordingly, if the sample includes both the portion spoken by the contacted party and the portion spoken by the call center agent, then the voice analytics performed on the sample may also indicate which words were spoken by the contacted party and which words were spoken by the call center agent. Depending on the embodiment, the PC module may use any number of different analytics approaches such as, for example, one or more of a phonetics approach, large-vocabulary continuous speech recognition (LVCSR) approach, and/or direct phrase recognition approach in performing voice analytics on communications. However, in other embodiments, the PC module may perform text analytics on the sample instead of voice analytics. That is to say, in particular embodiments, the PC module may first convert the voice sample to a text format and then perform text analytics on the sample to identify the words spoken in the sample. Any number of different text analytics software may be used to perform the analysis such as for example, software provided by IBM® or SAS®.

Furthermore, in particular embodiments, the PC module may not perform the analytics itself per se, but instead may have an exterior component perform the analytics and provide the PC module with results. For instance, in one example, the call center provides the voice samples to a third-party provider to perform the analytics on the samples. In this instance, the call center receives the analytics results from the third-party provider and stores the results. Thus, the PC module simply reads the analytics results from storage for the particular voice sample the PC module is currently working with. Depending on the embodiment, the analytics results may be provided in any number of different forms such as, for example, a text transcript of the words that were spoken in the voice sample.

In particular embodiments, the PC module also performs a lemmatization process on the detected words to map the words to their lexical roots or lemma forms in Operation 260. For instance, the lemmatization process would map the inflected word "better" to its lemma form of "good." This operation can be important in various embodiments in which the frequency of a word (whether in its lemma form or an inflected form) contributes to predicting the outcome for a particular event of interest. The PC module may be configured to use any number of available lemmatizers such as, for example, MorphAdorner offered for free by Northwestern University.

However, in other embodiments, the PC module may not perform a lemmatization process on the detected words because the inflected forms of words are found to be better indicators for predicting the outcome for a particular event of interest. For instance, in the example involving predicting whether a party with a past due amount owed on a car loan will submit the past due amount, the accuracy of the prediction may be contingent on the type of affirmative response received from the party. For example, the party stating during the conversation "certainly, I will put a check in the mail first thing Monday morning" may convey a different intention of the party then if the party stated "yea, yea, I will make sure to get a check in the mail first thing Monday morning." Therefore, in this example, if the PC module were to perform a lemmatization on the affirmative responses of "certainly" and "yea, yea," the PC module may map the words to their lexical root of "yes" and thus interpret the two responses similarly. Thus, as a result of performing a lemmatization process in this context, a loss in the accuracy of predicting whether the party will submit the past due amount may be realized.

Further, in some instances, the use of a lemmatizer may involve the use of too much computing capacity (can contribute to too much processing time) and in some embodiments, the PC module may be configured to perform stemming instead. Stemming also attempts to reduce a word to a base form by removing affixes, but the resulting stem is not necessarily a proper lemma. For instance, a stemming process would recognize the base form for the word "walking" is "walk." However, a stemming process would not typically recognize the lemma form of "good" for the word "better." In addition, a stemming process usually operates without consideration of the context of the word. For instance, the word "meeting" can be either the base form of a noun or a form of a verb "to meet." With that said, however, a stemming process typically operates on the single word "meeting" without considering the context of how the word is being used. Thus, a stemming process would not be able to discriminate between the two different meanings of the word "meeting" while on the other hand, lemmatizers typically can. However, stemmers are generally easier to implement and take less computing capacity than lemmatizers. Therefore, in some instances, the easier implementation and reduction in computing capacity of a stemmer may be more favorable in spite of the reduction in accuracy with respect to a lemmatizer.

Finally, it should be noted that in particular embodiments, the lemmatization process may be combined with the voice analytics process in that the two processes are performed virtually simultaneous. That is two say, while voice analytics are being performed to recognize the words spoken in a particular voice sample, the recognized words are being mapped to their lemma forms. Thus, in these particular embodiments, the Operations 255, 260 for performing voice analytics and lemmatization are practically viewed as a single operation, although two distinct processes are being carried out on the voice sample.

Once voice analytics has been performed on the voice sample to recognize the spoken words and the words have been mapped to their lemma forms, the PC module eliminates the "common" words from the set of recognized words for the voice sample in Operation 265. Generally speaking, "common" words are words that do not add to the predictive analysis because of their common everyday use. Typically, "common" words may be viewed as words that solely fulfill a grammatical function as opposed to a content function that carries meaning. For example, conjunctions such as "and" and "but" and/or pronouns such as "he," "she," or "they" may be eliminated from the set of recognized spoken words. In particular embodiments, the "common" words may be eliminated from the set of recognized spoken words before the lemmatization process is carried out on the set of recognized spoken words.

At this point, the PC module determines a frequency of occurrence for the remaining words in the set of recognized spoken words in Operation 270. It is noted that unless the voice sample is especially long, most of the remaining words typically only occur once in the voice sample. However, in many instances, frequency of occurrence for a number of different words may provide significant information with respect to predicting the outcome for an event of interest. For instance, in the example in which the call center is conducting an outbound call campaign to solicit donations for an animal shelter, the frequency of the word "agreed" spoken by the contacted party may indicate the party views the animal shelter in a positive light and thus may be significant with respect to predicting whether the party may make a donation to the animal shelter in the future.

Finally, similar to the PVC module, the PC module stores the remaining set of recognized spoken words for the voice sample along with the appropriate outcome (class) for the sample in Operation 275. Accordingly, the PC module then determines whether another sample is present in the set of voice samples to process in Operation 280. If so, then the PC module returns to Operation 250 and selects the next sample. As a result of the process flow 200B shown in FIG. 2B, the content is extracted from the selected voice samples and is stored along with each sample's corresponding outcome in storage. Accordingly, the stored content may be used to train and test SVM models for each of the three outcomes.

Training SVM Models Module

Figure 3:
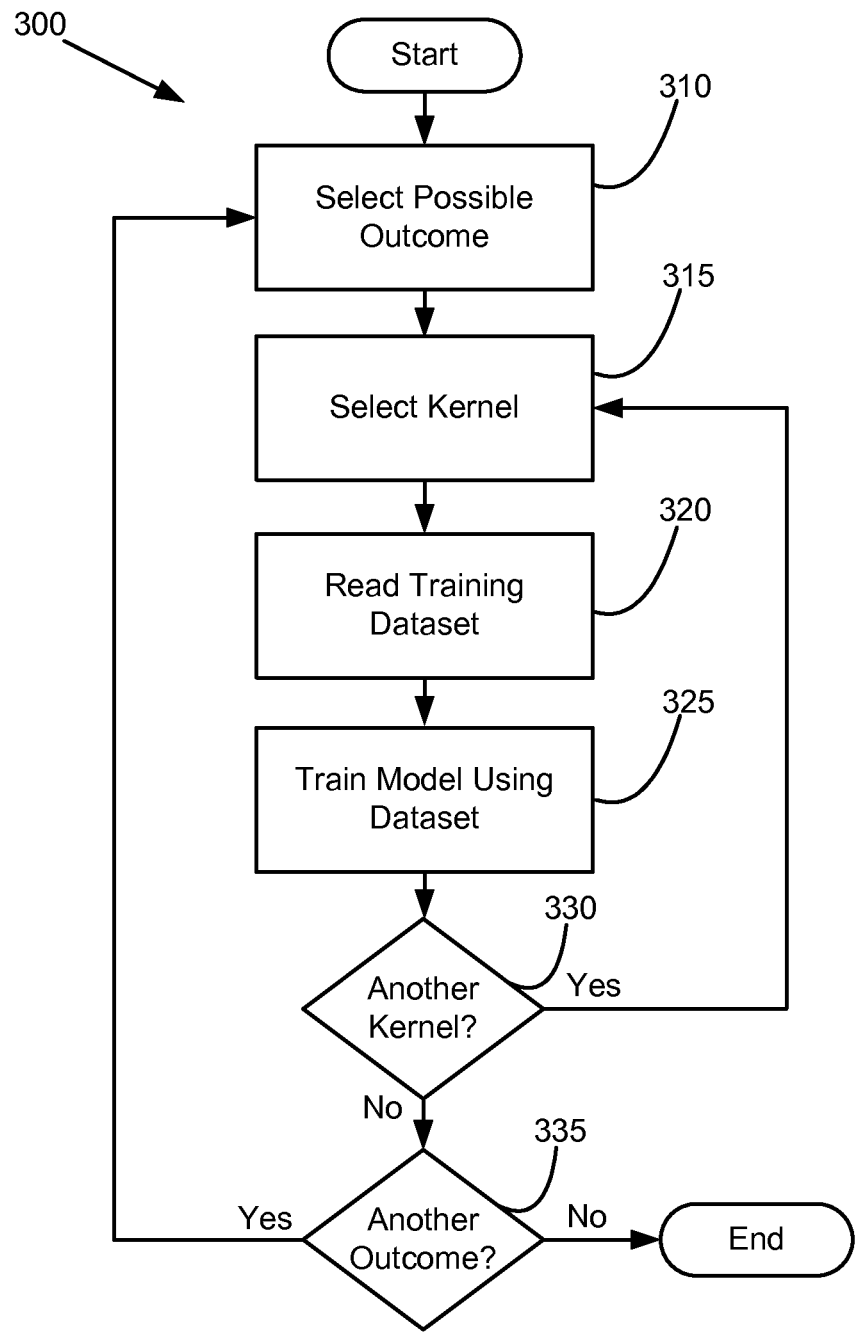
FIG. 3 illustrates an embodiment of a process flow for training classifier models based on features of known voice samples in accordance with various technologies and concepts disclosed herein.

Now that a dataset has been generated from the set of voice samples by the PVC module and the PC module, SVM models may be trained using the dataset. Thus, turning now to FIG. 3, additional details are provided regarding a process flow 300 that may be used to train a particular SVM model. Again, for purposes of explaining the process, the description will focus on the example involving the call center conducting an outbound calling campaign to solicit donations for an animal shelter. Specifically, FIG. 3 is a flow diagram showing a training SVM models (TRSM) module for performing such functionality according to various embodiments of the invention. For example, the process flow 300 shown in FIG. 3 may correspond to operations carried out by a processor in a component, such as the predictive analytics server 140 described above with respect to the call center architecture 100, as it executes the TRSM module stored in the component's volatile and/or nonvolatile memory.

As previously discussed, in the example, the predicted outcome to initial contact with a party who has indicated he is not interested at the current time in donating to the animal shelter is: (1) a follow-up call to the party will lead to a donation; (2) a follow-up email to the party will lead to a donation; or (3) neither one of the actions will lead to a donation. Therefore, the event of interest in this instance involves more than two outcomes (classes). As a result, multiple SVM models are needed for each of the two different types of input (i.e., the voice characteristics and content). As previously mentioned, for these types of situations, a one-against-all approach or a one-against-one approach can be used. However, for purposes of describing the invention, a one-against-all approach is selected.

Turning now to FIG. 3, the TRSM module selects one of the outcomes in Operation 310. For instance, turning to the example, the TRSM module selects the outcome in which a follow-up call to a contacted party leads to a donation. Accordingly, the TRSM module executes the process to train a SVM model for predicting this particular outcome against the remaining two outcomes.

An important aspect of any SVM model is the selection of the kernel function to be used for the model. This is because the parameters of the kernel (the hyperparameters, which include the soft margin constant and any parameter the kernel function may depend on) control the flexibility of the resulting classifier in fitting the data. That is to say, the parameters of the selected kernel must have enough flexibility to discriminate between the two classes. For instance, a linear kernel (lowest degree polynomial) does not have sufficient flexibility to discriminate between two classes when a non-linear relationship between features exists. Whereas a degree-2 polynomial kernel (polyorder=2) may have sufficient flexibility to discriminate between the two classes with a sizable margin. Further, a degree-5 polynomial kernel would provide even more flexibility to discriminate between the two classes. However, the "boundary" between the two classes provided by the degree-5 polynomial kernel (polyorder=5) would have greater curvature than the "boundary" between the two classes provided by the degree-2 polynomial kernel. As a result, the amount of flexibility provided by the degree-5 polynomial kernel may lead to over fitting the samples. Accordingly, a kernel must be selected that provides enough flexibility to discriminate between the two classes, but not too much flexibility to lead to over fitting the samples.

In many instances, the selection of an appropriate kernel function is by trial and error. Accordingly, in various embodiments of the invention, the TRSM module is configured to use a similar approach to selecting the appropriate kernel function. For instance, with respect to the voice characteristics data collected for the example, the TRSM module is configured in particular embodiments to select the "best" kernel function among linear, radial basis function (RBF), quadratic, polynomial, and multi-layer perceptron (MLP) for each SVM model. Note that many times, a linear kernel function is tried first to provide a baseline, and then non-linear kernel functions are used to attempt to improve performance. With respect to the example, the hyperparameters are defined as polyorder=3 for the polynomial, default scale is set to [1 −1] for the MLP, and sigma=200 for the RBF. Similarly, with respect to the content data collected for the example, the TRSM module is configured in particular embodiments to select the "best" kernel function among linear, RBF, and polynomial. However, for this type of data, a second order polynomial is considered.

Accordingly, returning to FIG. 3, the TRSM module selects a kernel function for training in Operation 315. Thus, for the first progression of training the SVM model for the selected outcome, the TRSM module selects a linear kernel function. Next, in Operation 320, the TRSM module reads the training dataset. The training dataset includes both samples tagged with the selected outcome (that is, samples in which the selected outcome occurred) and samples tagged with the remaining outcomes. Typically, the number of samples included in the training dataset tagged with the selected outcome is roughly the same number of samples included in the training dataset tagged with the remaining outcomes. Further, the training dataset may be segmented so that cross-validation test (e.g., seven-fold cross-validation test) can be run on the entire training dataset.

For example, a segmentation of the training dataset may include fifty-five samples in which the outcome was a follow-up call to a contacted party led to a donation, twenty-seven samples in which the outcome was a follow-up email to a contacted party led to a donation, and twenty-one samples in which the outcome was neither one of the actions led to a donation. The samples in which the outcome was neither one of the actions led to a donation may include roughly the same number of samples for each of the actions. That is to say, the samples in which the outcome was neither one of the actions led to a donation may include ten samples in which the outcome was a follow-up call to a contacted party did not lead to a donation and eleven samples in which the outcome was a follow-up email to a contacted party did not lead to a donation. It should be noted that in particular embodiments, the training datasets may be identified prior to the TRSM module training the SVM models. Thus, for these particular embodiments, the TRSM module simply reads the appropriate training dataset for the particular outcome.

At this point, the TRSM module trains the SVM model for the particular outcome using the selected kernel function and the appropriate training dataset in Operation 325. Depending on the embodiment, the TRSM module may make use of publicly available machine learning libraries, such as LIBSVM for example. LIBSVM is integrated software for support vector classification that can be linked to another program for use. Thus, in various embodiments, the TRSM module is linked to the LIBSVM software and uses the software to train the SVM models.

Once the SVM model for the particular kernel has been optimized, the TRSM module determines whether there is another kernel function to try with respect to the SVM model for the particular outcome in Operation 330. If so, then the TRSM module returns to Operation 315 and selects the next kernel and then repeats the process steps for training the SVM model using the newly selected kernel. Once the TRSM module has completed training the SVM model using all of the kernel functions, the TRSM module determines whether there is another outcome with respect to the event of interest in Operation 335. If so, the TRSM module repeats the process discussed above for the next outcome.

Figure 4:
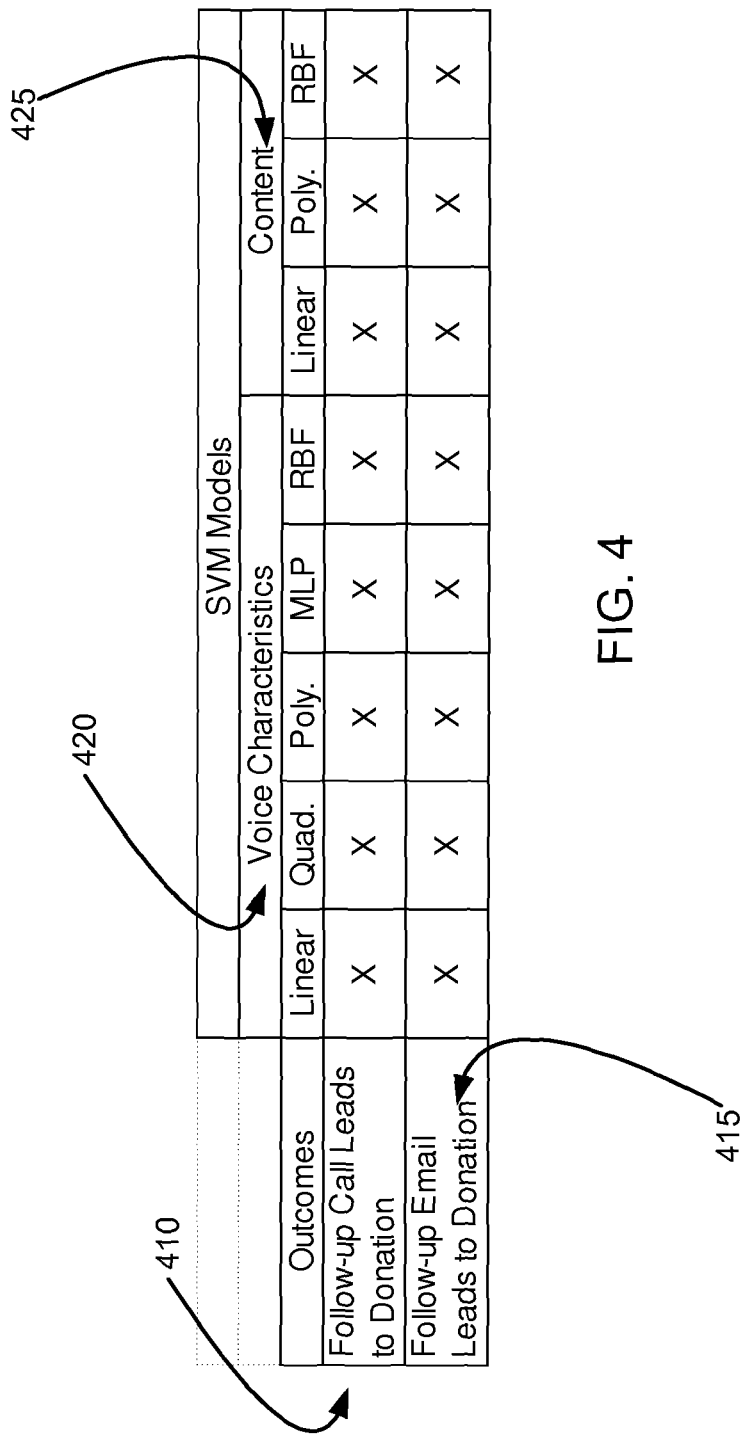
FIG. 4 illustrates a table displaying the trained SVM models produced for possible outcomes of an event of interest.

At the end of the training process flow 300, the TRSM module has trained an optimized SVM model for each kernel function type, for each possible outcome. Accordingly, FIG. 4 illustrates a table showing the different SVM models trained for the example involving the call center conducting the outbound calling campaign to solicit donations for an animal shelter. As one can see, a SVM model has been trained for the two outcomes 410, 415, with respect to each kernel function for both sets of input (voice characteristics 420 and content 425) to produce sixteen different SVM models. It should be noted that in particular embodiments, the TRSM module may include neither action leading to a donation as a separate outcome for which a SVM model is trained. Thus, for these particular embodiments, the TRSM module would produce twenty-four different SVM models. However, in this instance, the SVM models are defined so that a prediction of an instance in which neither action leads to a donation is identified by a particular call to a contacted partied not being classified as one in which a follow-up call leads to a donation or a follow-up email leads to a donation. The next step in the overall process is to test the different SVM models to determine the appropriate kernel function for each outcome.

Kernel Selection Module

Figure 5:
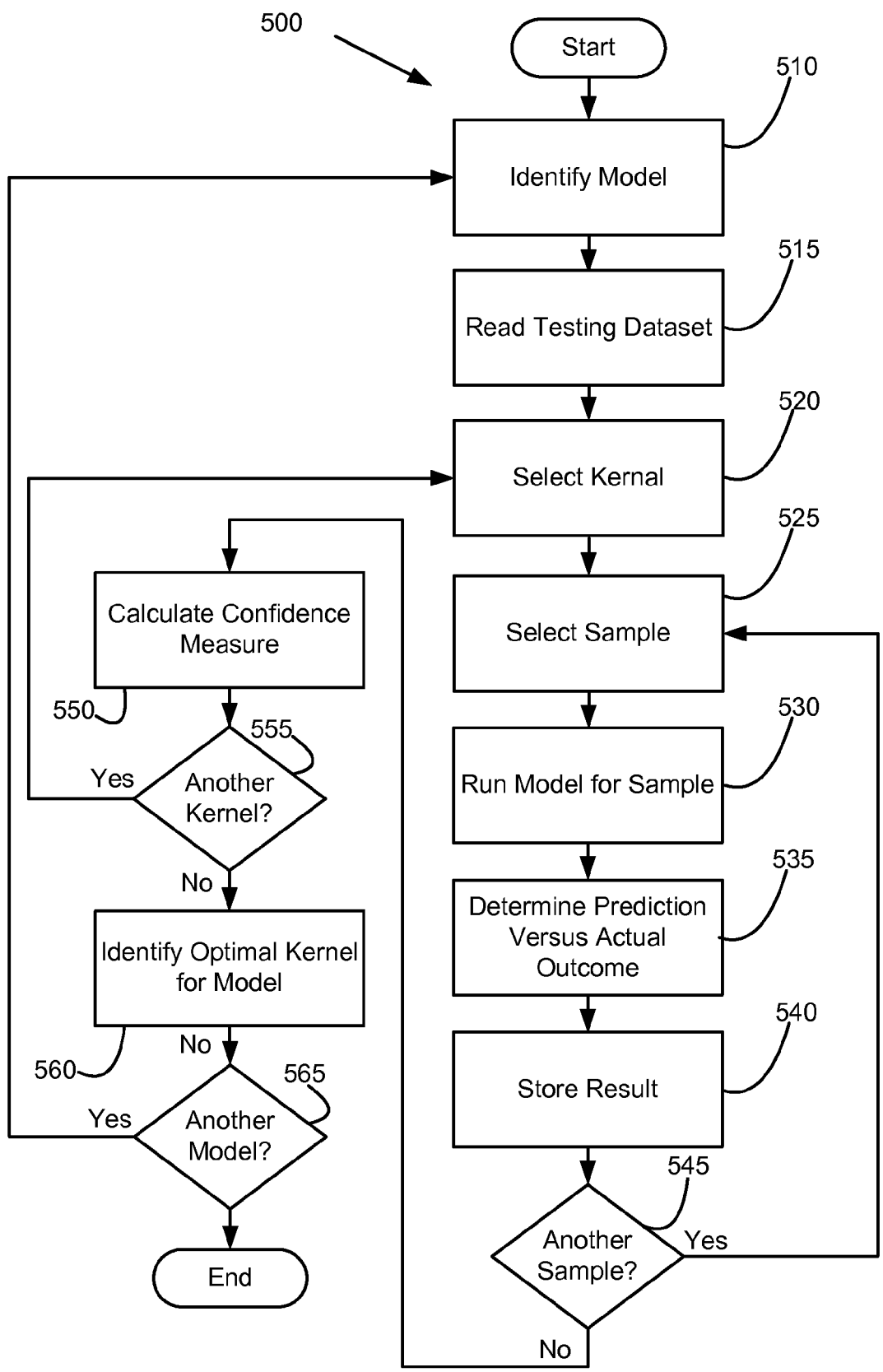
FIG. 5 illustrates an embodiment of a process flow for identifying optimal kernel functions for classifier models based on features of known voice samples in accordance with various technologies and concepts disclosed herein.

Once the SVM models using the different kernels have been trained for each outcome, the next process involves selecting the "best" kernel for each outcome with respect to each input data type. Thus, turning now to FIG. 5, additional details are provided regarding a process flow 500 that may be used to select the appropriate kernel for the SVM model for each outcome with respect to each input data type. Again, for purposes of explaining the process, the description will focus on the example involving the call center conducting an outbound calling campaign to solicit donations for an animal shelter. Specifically, FIG. 5 is a flow diagram showing a kernel selection module for performing such functionality according to various embodiments of the invention. For example, the process flow 500 shown in FIG. 5 may correspond to operations carried out by a processor in a component, such as the predictive analytics server 140 described above with respect to the call center architecture 100, as it executes the kernel selection module stored in the component's volatile and/or nonvolatile memory.

Thus, in Operation 510, the kernel selection module identifies the first SVM model for an outcome for one of the input data types. For instance, the kernel selection module identifies the SVM model trained using voice characteristics for the outcome in which a follow-up call leads to a donation. Next, the kernel selection module reads a testing dataset to use for determining a confidence measure for the SVM model in Operation 515. Similar to the training dataset used in training the various SVM models and corresponding kernel functions, the testing dataset includes both samples tagged with the selected outcome (that is, samples in which the selected outcome occurred) and samples tagged with the remaining outcomes. However, the testing dataset does not typically include samples that were used in the training dataset for training the various SVM models and corresponding kernel functions. Thus, in various embodiments, the samples for the testing dataset are previously identified and set aside so that they are only used for the purpose of identifying the "best" kernel for each SVM model.

At this point, the kernel selection module selects the first kernel for this particular SVM model in Operation 520. Thus, returning to the example, the kernel selection module selects the SVM model trained using a linear kernel for the identified SVM model. Accordingly, the kernel selection module selects a sample from the testing dataset in Operation 525 and runs the SVM model in Operation 530. For instance, with respect to the SVM model trained using a linear kernel and voice characteristics, the kernel selection module selects a first sample of voice characteristics from the testing dataset and runs the SVM model trained using a linear kernel for the sample. The output from the model indicates (predicts) whether the sample is classified as a member of the particular outcome or not. That is to say, the output from the model indicates whether the sample is predicted to have an outcome of a follow-up phone call leading to a donation or not.

Accordingly, in Operation 535, the kernel selection module determines whether the prediction provided by the SVM model was correct or not for the sample. For instance, in particular embodiments, if the SVM model correctly predicted the outcome to be a follow-up call would lead to a donation and the actual outcome for the sample was a follow-up call did lead to a donation, then the kernel selection module stores that the testing of the sample resulted in a true positive. Likewise, the kernel selection module stores a true negative if the SVM model correctly predicted the outcome is not a follow-up call would lead to a donation, a false positive if the SVM model incorrectly predicted the outcome to be a follow-up call would lead to a donation, and a false negative if the SVM model incorrectly predicted the outcome is not a follow-up call would lead to a donation. Once the kernel selection module determines whether the prediction was correct or not, the module stores the result in Operation 540.

At this point, the kernel selection module determines whether another sample is present in the testing dataset in Operation 545. If so, then the kernel selection module returns to Operation 525 and selects the next sample from the testing dataset and repeats the operations for running the SVM model on the sample and storing the result accordingly.

Once the kernel selection module has completed running all of the samples in the testing dataset, the kernel selection module calculates a confidence measure for the SVM model using the particular kernel function in Operation 550. Depending on the embodiment, a number of different confidence measures may be used. For instance, in particular embodiments, the kernel selection module calculates an accuracy measure of the SVM model for the kernel function based on the testing results stored for the samples. For example, in one embodiment, the SVM model determines an accuracy measure as the total number of true positives divided by the total number of true positives plus the total number of false negatives (i.e., Ttp/(Ttp+Tfn)). While in another embodiment, the SVM model determines an accuracy measure as the total number of true positives plus the total number of true negatives divided by the total number of samples (i.e., (Ttp+Ttn)/TofSamples). Once calculated, although not shown in FIG. 5, the kernel selection module stores the confidence measure.

Next, the kernel selection module determines whether another kernel function for the particular SVM model needs to be evaluated in Operation 555. Thus, returning to the example, the kernel selection module determines whether another kernel function needs to be evaluated with respect to predicting the outcome of a follow-up call leading to a donation based on voice characteristics. If so, then the kernel selection module returns to Operation 520 and selects the SVM model for the next kernel function (e.g., the quadratic kernel function). Therefore, the process flow 500 described above in calculating a confidence measure for the particular SVM model and kernel function are repeated until a confidence measure has been calculated for all of the kernel functions for the particular SVM model.

At this point, the kernel selection module identifies the optimal kernel for the particular SVM model based on the confidence measures calculated for the various kernel functions in Operation 560. Thus, the kernel selection module identifies the optimal kernel for the SVM model for predicting the outcome of a follow-up call leading to a donation based on voice characteristics by selecting the kernel function with the largest confidence measure. Accordingly, as a result, the optimal SVM model for the particular outcome based on the input features is identified. Once the kernel selection module has identified the optimal kernel for the particular SVM model, the module determines whether another SVM model needs to be evaluated in Operation 565. If so, then the kernel selection module repeats the operations for the process flow 500 shown in FIG. 5 for the next SVM model. Thus, returning to the example, the kernel selection module would perform the operations or the process flow 500 shown in FIG. 5 a total of sixteen times in order to evaluate each of the SVM models with respect to the three different outcomes for each of the kernel functions and for the two different input types (voice characteristics and content).

Figure 6:
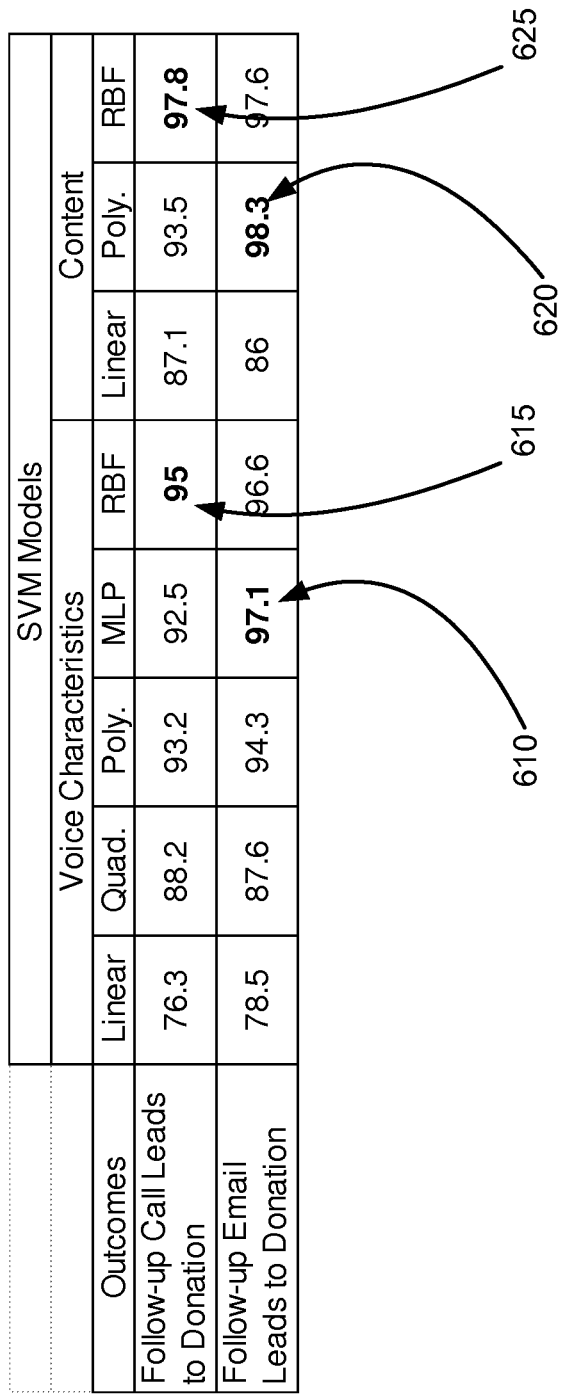
FIG. 6 illustrates the confidence measures for different kernel functions according to possible outcomes of an event of interest.

Turning now to FIG. 6, a table is provided that shows the confidence measures calculated for the various SVM models and corresponding kernels for the example involving the call center conducting an outbound calling campaign to solicit donations for an animal shelter. As one can see in the table, with respect to using voice characteristics as input, the optimal kernel for the SVM model predicting a follow-up call will lead to a donation is the RBF kernel. This is because this particular kernel provided the largest confidence measure 615. Likewise, the confidence measure 610 for the MLP kernel was found to be the largest for the SVM model predicting a follow-up email will lead to a donation. With respect to the SVM models in which the content of the communications is used as input, the confidence measure 625 of the RBF kernel provided the largest value for the SVM model predicting a follow-up call will lead to a donation and the confidence measures 620 of the polynomial kernel provided the largest values for the SVM models for predicting a follow-up email will lead to a donation. Thus, as a result of calculating a confidence measure for each instance of the kernel functions for the various SVM models for outcomes and types of inputs, an optimal kernel for use with each SVM model can be determined.

Testing SVM Models Module

Now that a SVM model has been trained for each outcome and data input type and an appropriate kernel function has been identified for each SVM model, the final process involved in developing the SVM models for predicting an outcome for an event of interest is testing the accuracy of the SVM models. Theoretically, in a one-against-all approach, a sample can be classified only if one of the SVM models accepts the sample while all other SVM models reject it at the same time. However, this can lead to a large number of samples not being able to be classified. Therefore, in practice, the class (e.g., the outcome) whose decision function produces the largest value for a particular sample is typically selected as the appropriate class for the sample.

Figure 7:
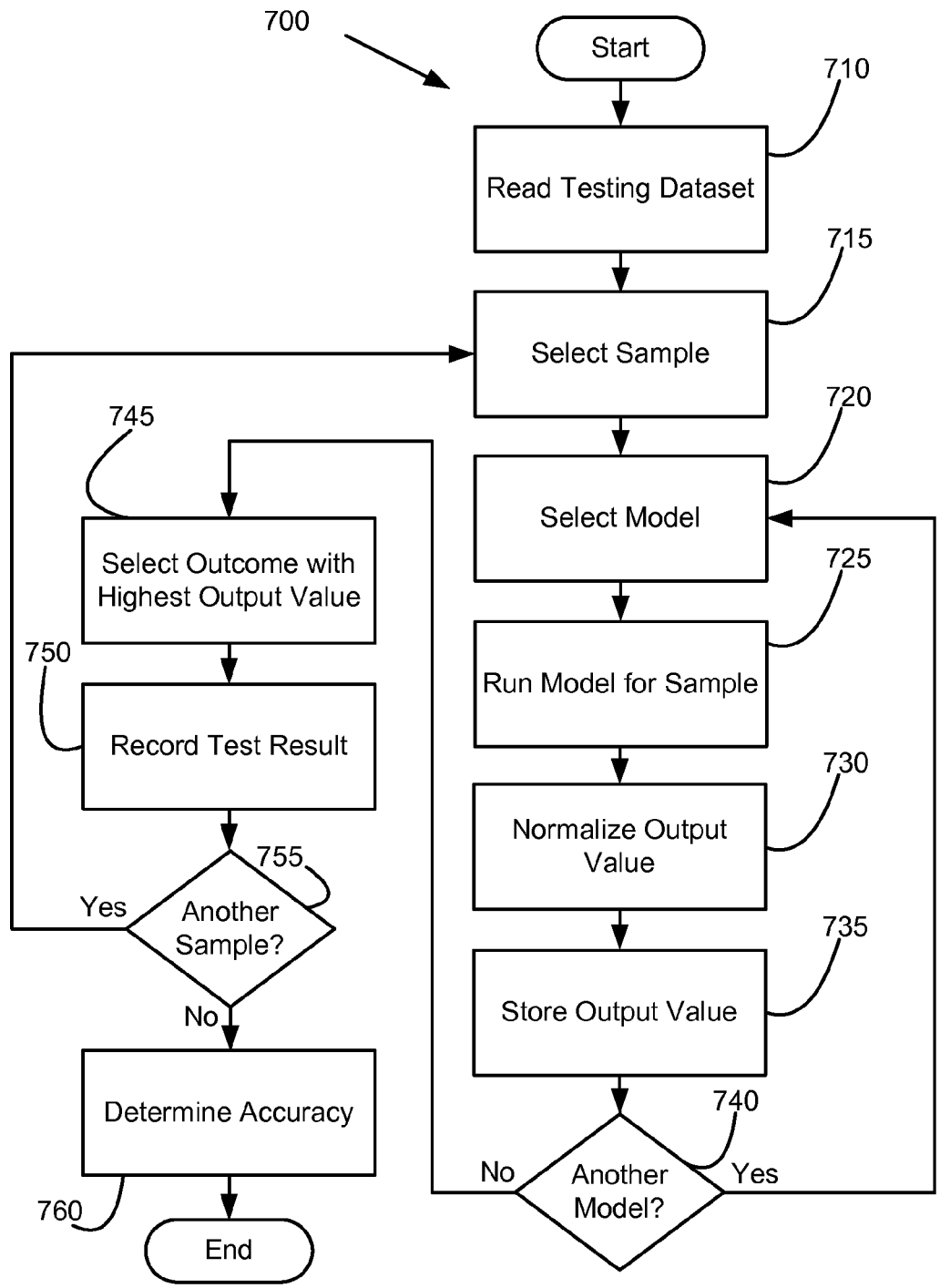
FIG. 7 illustrates an embodiment of a process flow for testing the accuracy of SVM models for predicting an outcome for an event of interest associated with a party in accordance with various technologies and concepts disclosed herein.

Thus, turning to FIG. 7, additional details are provided regarding a process flow 700 that may be used in determining the accuracy of the SVM models in predicting the outcome for the event of interest. Again, for purposes of explaining the process, the description will focus on the example involving the call center conducting an outbound calling campaign to solicit donations for an animal shelter. Specifically, FIG. 7 is a flow diagram showing a testing SVM models (TSSM) module for performing such functionality according to various embodiments of the invention. For example, the process flow 700 shown in FIG. 7 may correspond to operations carried out by a processor in a component, such as the predictive analytics server 140 described above with respect to the call center architecture 100, as it executes the TSSM module stored in the component's volatile and/or nonvolatile memory.

Accordingly, the TSSM module reads a testing dataset in Operation 710. In particular embodiments, the testing dataset includes samples tagged with each of the different outcomes that were not used in training the various SVM models and identifying the corresponding optimal kernel functions. That is to say, in particular embodiments, the samples found in this particular testing dataset are samples that were set aside for this specific purpose so that the testing of the accuracy of the SVM models for predicting an outcome for the event of interest can be conducted on "independent" samples that were not exposed to the SVM models during training and the process for identifying the optimal kernel function for each individual SVM model.

In Operation 715, the TSSM module selects a sample from the testing dataset. In turn, the TSSM module selects the appropriate SVM model for a particular outcome with respect to the input features in Operation 720. For instance, if the TSSM module is currently testing the accuracy of the SVM models using voice characteristics as input to predict outcomes with respect to initial contacts with parties who have indicated they are not interested at the current time in donating to the animal shelter, then the TSSM module may select the SVM model for predicting a follow-up call will lead to a donation or not.

At this point, the TSSM module runs the SVM model for the selected sample in Operation 725, and the output is a value representing the product of the decision function for the SVM model. Accordingly, the output carries two types of information. The first type of information is the sign of the output (either + or −) indicates a hard decision on whether the sample belongs to the outcome associated with the SVM model. If the output is a positive value, then the sample does belong to the outcome and vise versa if the output is a negative value. The second type of information is the absolute value of the output which indicates how strong the prediction is. This is because the farther the sample lies away from the decision boundary of the two classes for a particular SVM model, the larger the absolute value the decision function provides for the SVM model.

With respect to using multiple SVM models (classifiers) for identifying a class in a multi-class scenario, a problem that can often be encountered is that the competence of the different classifiers may vary among the classifiers. That is to say, if the outputs to the SVM models are simply employed as the only index to indicate how strong a sample belongs to a particular class, the underlying assumption is that the SVM models are equally reliable and this is not always true. Accordingly, in particular embodiments, the TSSM module normalizes the output from the SVM model to account for the variable competence between different SVM models in Operation 730. Depending on the embodiment, the TSSM module may be configured to normalize the output using different mechanisms. For instance, in one embodiment, the TSSM module is configured to multiply the output for a particular SVM model by a static reliability measure. This concept was introduced by Yi Liu and Yuan F. Zheng in a paper entitled "One-Against-All Multi-Class SVM Classification Using Reliability Measures."

Generally speaking, the performance of a SVM model (classifier) is evaluated by the generalization error. The smaller the generalization error for a particular classifier, the more reliable the classifier is. Unfortunately, the generalization error is never known. Therefore, in many instances, one looks to the training error for a particular classifier as an estimate of the generalization error. However, in instances in which the training sample size is relatively small with respect to the dimensionality of the feature vector, a small training error does not guarantee a small generalization error. With that said, one advantage of a SVM model is that minimizing the objective function will also minimize the upper bound of the generalization error. Thus, in particular embodiments, a static reliability measure for a particular SVM model may be defined as:

$$\lambda_{srm} = \exp(-\|w\|^2 / 2CN).$$

Where C is the regularization parameter and N is the training size. Note that the test sample (x) does not appear in the equation for the static reliability measure and thus the static reliability measure is the same for all samples. This is the reason this particular reliability measure is named the static reliability measure. For this reason, the computational capacity to determine this reliability measure is typically not high.

In another embodiment, the TSSM module is configured to multiply the output for a particular SVM model by a dynamic reliability measure. While the static reliability measure assumes a SVM model to be equally effective throughout the entire feature space, in reality the SVM model exhibits spatial variation. To account for this condition, a dynamic reliability measure may be used. The basic idea is to estimate the classifier's reliability in a local region of feature space surrounding the test sample. Thus, in these instances, the dynamic reliability measure is defined as:

$$\lambda_{drm} = \exp\left(-\left(\|w\|^2 / 2CN + \sum_{i=1}^{k_X} (1 - \hat{y}_i f(\hat{x}_i))_+ / k_X\right)\right)$$

In this equation, one can see that unlike the static reliability measure, the dynamic reliability measure is a dynamic function of x, which varies depending on the location of the sample and the classified label C(x). For this reason, the dynamic reliability measure should be recomputed as new samples come in, making using this particular reliability measure more expensive. Accordingly, whatever reliability measure is used, the TSSM module normalizes the output value by multiplying it by the reliability measure to weight the output value based on the reliability of the SVM model.

At this point, the TSSM module stores the normalized output value in Operation 735 and determines whether another model is available in Operation 740. That is to say, once the TSSM module has completed determining the normalized output value for the SVM model predicting the outcome to be a follow-up call resulting in a donation, the TSSM module determines that the sample needs to be processed for the SVM model predicting the outcome to be a follow-up email resulting in a donation. Accordingly, the TSSM module returns to Operation 720 and processes the sample using the selected model.

Once the TSSM module has completed running the sample for all the available SVM models, the TSSM module selects the outcome with the highest output value as the predicted outcome for the sample in Operation 745. At this point, the TSSM module records the test result for the sample in Operation 750. Depending on the embodiment, storing the test result may also involve determining whether the predicted outcome matches the actual outcome of the sample or not. In other words, the TSSM module may determine whether the testing of the sample resulted in a true positive, true negative, false positive, or false negative and store this information along with the test result for the sample.

The TSSM module then determines whether another sample is available in the testing dataset for testing the SVM models in Operation 755. If so, then the TSSM module returns to Operation 715 and selects the next sample for testing. If not, then the TSSM module determines the accuracy of the SVM models with respect to predicting the outcome for the event of interest in Operation 760. Again, depending on the embodiment, a number of different calculations can be carried out for determining the accuracy of the SVM models. However, in many instances, the accuracy of the SVM models may be required to be above a particular threshold in order to be acceptable for use in predicting the outcome for future occurrences of the event. If the accuracy is not acceptable, then the features used as inputs and/or the kernel functions being used for the various SVM models may be reconsidered. That is to say, the process for generating SVM models to predict the outcome of an event of interest may involve a certain amount of trial and error to reach a set of SVM models having the desired accuracy.

Outcome Prediction Module

Once the SVM models have been trained to an acceptable level of accuracy, they may be used to predict the outcome of current occurrences of the event of interest. As previously mentioned, the logic behind developing SVM models is to predict an outcome for an event of interest based on voice characteristics extracted from a communication with a party in which the event was discussed. This is because the characteristics reflected in the party's voice while speaking on the communication can impart the party's true intention with respect to the event of interest. Likewise, the logic behind developing SVM models to predict the outcome for the event is because the words spoken by the party during the communication can also impart the party's true intent. Therefore, looking at the example, the two sets of SVM models are used to process voice characteristics extracted from a contacted party's speech and the content (words spoken) by the party during the initial telephone call in which the contacted party indicates he is not currently interested in making a donation to the animal shelter to predict whether a follow-up call or email may lead to a donation from the contacted party.

Figure 8:
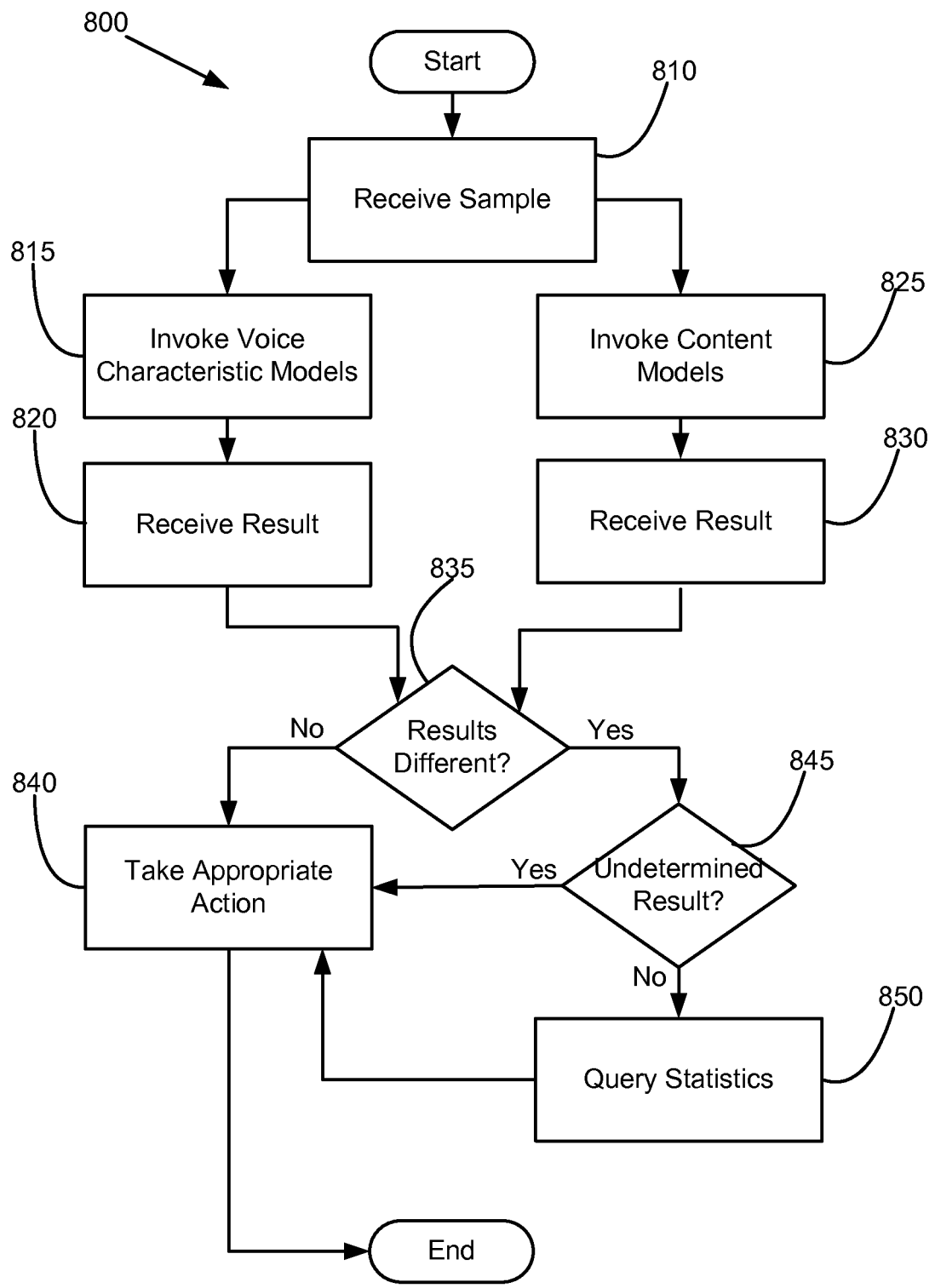
FIG. 8 illustrates an embodiment of a process flow for predicting an outcome for an event of interest associated with a party in accordance with various technologies and concepts disclosed herein.

Thus, turning to FIG. 8, additional details are provided regarding a process flow 800 that may be used in predicting the outcome for an event of interest. Specifically, FIG. 8 is a flow diagram showing an outcome prediction module for performing such functionality according to various embodiments of the invention. For example, the process flow 800 shown in FIG. 8 may correspond to operations carried out by a processor in a component, such as the predictive analytics server 140 described above with respect to the call center architecture 100, as it executes the outcome prediction module stored in the component's volatile and/or nonvolatile memory.

Accordingly, in Operation 810, the outcome prediction module receives the voice sample in relation to the event for which an outcome is to be predicted. Depending on the embodiment, the outcome prediction module may receive the voice sample in real-time as the communication is taking place between a call center agent and a party. For instance, the outcome prediction module may be configured to bridge onto the communication taking place between the call center agent and the party. While in other embodiments, the outcome prediction module receives the voice sample after the communication between the call center agent and the party has concluded. Thus, in the example, the outcome prediction module receives a voice sample of a contacted party that indicated during an initial phone call that he was not interested in making a donation to the animal shelter at the present time.

Next, in Operation 815, the outcome prediction module invokes the SVM models based on the voice characteristics. In particular embodiments, this operation involves the outcome prediction module invoking another module that is configured to carry out the operations to generate a prediction of the outcome for the initial call with the contacted party based on the party's voice characteristics. Likewise, in Operation 825, the outcome prediction module invokes the SVM models based on the content of the party's speech made during the initial call. Again, in particular embodiments, the outcome prediction module invokes another module that is configured to carry out the operations to generate a prediction of the outcome for the initial call with the contacted party based on the content of the party's speech.

At this point, the two sets of SVM models for the two different types of input features generate predictions for the outcome of the initial call with the contacted party. Accordingly, in Operation 820, the outcome prediction module receives the prediction result produced by the SVM models based on the voice characteristics. In addition, in Operation 830, the outcome prediction module receives the prediction results produced by the SVM models based on the content.

Once the outcome prediction module has received the two predictions from the two sets of SVM models, the outcome prediction module compares the two predictions to determine whether the two predictions are the same or are different in Operation 835. If the two predictions are the same, then the outcome prediction module takes the appropriate action according to the predicted outcome in Operation 840. For instance, in one embodiment, the outcome prediction module simply records the prediction so that the call center may retrieve the prediction and take action accordingly. While in other embodiments, the outcome prediction module may initiate one or more actions according to the predicted outcome for the event of interest. For instance, in one embodiment, the outcome prediction module may query one or more actions to take from a database with respect to the predicted outcome and then initiate the necessary steps so that the actions are taken. Such actions may include, for example, scheduling a follow-up communication to the contacted party, adding the party's contact information to a particular list of interest such as a no-contact list, and/or identifying the contacted party to receive marketing material in the mail or via email. Those of ordinary skill in the art can envision numerous activities that may be initiated as a result of the predicted outcome for the event of interest.

Returning to Operation 835, if instead the outcome prediction module determines the two predictions are different, then the outcome prediction module determines whether either of the two predictions is undetermined as to the outcome in Operation 845. For instance, in particular embodiments, the call center may set a threshold level that the highest output value must meet in order for the predicted outcome from a set of SVM models to be considered reliable. Thus, in these particular embodiments, if the highest output value is not larger than the threshold level, then the predicted outcome for the particular event of interest is considered to be undetermined.

For instance, in the example, the outcome prediction module may receive the two predictions from the two sets of SVM models with respect to the initial call made to the contacted party about making a donation to the animal shelter. One of the predictions may indicate that the set of SVM models were undetermined as to whether a follow-up call would lead to a donation, a follow-up email would lead to a donation, or neither would lead to a donation. In this instance, the outcome prediction module may be configured to take a different course of action depending on the embodiment. In one embodiment, the outcome prediction module may simply use the other prediction (assuming it predicts one of the three possible outcomes) as the credible prediction for the initial call. While in another embodiment, the outcome prediction module may flag the initial call to bring the call to the call center's attention that at least one of the sets of SVM models could not provide a predicted outcome for the call. Accordingly, in various embodiments, the outcome prediction module takes the appropriate actions when such a condition arises.

Finally, if the outcome prediction module determines in Operation 845 that an undetermined result does not exist for the two predictions, then the outcome prediction module queries historical statistics with respect to the two sets of SVM models in Operation 850. Thus, in particular embodiments, historical statistics are gathered on the accuracy of the predictions provided by the two sets of SVM models and stored so that they can be referenced on occasions when the two sets of SVM models disagree on a prediction for the outcome to the particular event of interest.

Figure 9:
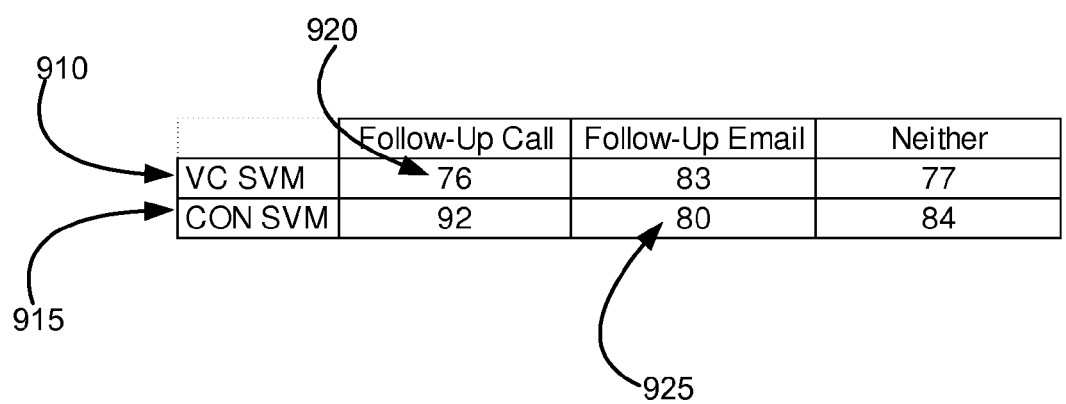
FIG. 9 illustrates data showing the historical accuracy of classifier models with respect to predicting an outcome for an event of interest associated with a party in accordance with various technologies and concepts disclosed herein.

For instance, in the example, the set of SVM models based on voice characteristics may provide a predicted outcome that a follow-up call will lead to a donation made by the contacted party while the set of SVM models based on the content may provide a predicted outcome that a follow-up email will lead to the donation. In this instance, the outcome prediction module may query statistics on the historical accuracy of the two sets of SVM models to determine which predicted outcome should be considered to be the more accurate prediction. Thus, turning to FIG. 9, information is provided on the historical accuracy of the two sets of SVM models with respect to the three possible outcomes to the initial call conducted with the party. As the information shows, the set of SVM models based on voice characteristics 910 has accurately predicted the outcome of the initial call being a follow-up call that leads to a donation seventy-six percent of the time 920. While the set of SVM models based on content 915 has accurately predicted the outcome of the initial call being a follow-up email that leads to a donation eighty percent of the time 925. Therefore, in this example, the outcome prediction module would consider the set of SVM models based on content's predicted outcome to be more accurate and credible with respect to the initial call placed to the contacted party.

In particular embodiments, statistics on the historical accuracy of the two sets of SVM models may be gathered for various sub-groups. For instance, statistics may be gathered for various demographics such as, for example, residency, age, and/or sex. Thus, in these particular instances, the outcome prediction module may query statistics on the historical accuracy of the two sets of SVM models with respect to the relevant sub-group. For example, if the party is a resident of the state of Texas, then the outcome prediction module may query statistics on the historical accuracy of the two sets of SVM models for past parties who were also residents of the state of Texas. Those of ordinary skill in the art can envision other types of sub-groups that statistics may be gathered on in light of this disclosure.

SVM Models Module

Figure 10:
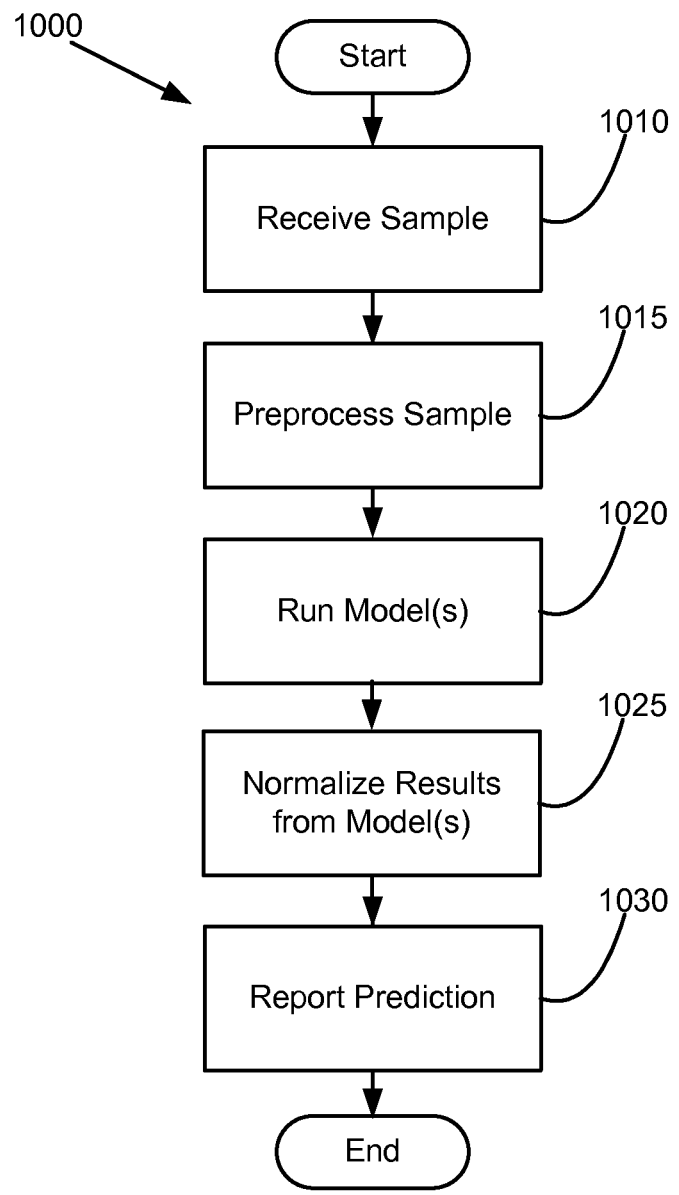
FIG. 10 illustrates an embodiment of a process flow for generating a prediction of an outcome for an event of interest associated with a party in accordance with various technologies and concepts disclosed herein.

FIG. 10 provides additional details regarding a process flow 1000 that may be used in generating a predicted outcome for an event of interest based on a set of SVM models. More specifically, FIG. 10 is a flow diagram showing a SVM models module for performing such functionality according to various embodiments of the invention. For example, the SVM models module may be the module invoked by the outcome prediction module described above to generate a predicted outcome for the event of interesting using the set of SVM models based on voice characteristics or the set of SVM models based on content. Therefore, the process flow 1000 shown in FIG. 10 may correspond to operations carried out by a processor in a component, such as the predictive analytics server 140 described above with respect to the call center architecture 100, as it executes the outcome prediction module stored in the component's volatile and/or nonvolatile memory.

Accordingly, in Operation 1010, the SVM models module receives the voice sample to be used to generate the predicted outcome for the event of interest. Upon receiving the sample, the SVM models module preprocesses the sample in Operation 1015. Accordingly, the SVM models module preprocesses the sample in the same fashion as were the samples using in training and testing the SVM models. Thus, for example, for the set of SVM models configured for voice characteristics, the voice sample is normalized and processed so that the appropriate voice characteristics are extracted from the sample. While for the set of SVM models configured for content, voice analytics is performed on the voice sample to identify the words that are spoken by the party as well as lemmatization is performed on the identified words spoken in the voice sample and/or elimination is performed to eliminate the "common" words found in the voice sample. Finally, the frequency of the detected words is determined so such information can be used as input in the set of SVM models.

At this point, the SVM models module runs the set of SVM models based on the features extracted/identified for the voice sample to produce an output value for each SVM model in Operation 1020. In addition, in particular embodiments, the SVM models module may normalize each output value from the SVM models in Operation 1025. Typically this operation is carried out if the output values were normalized during the test phase for determining the accuracy of the set of SVM models. For instance, the SVM models module may multiply each output value from the set of SVM models by a reliability measure to normalize the output values.

At this point, the SVM models module typically selects the predicted outcome as the outcome associated with the SVM model producing the largest output value. However, in particular embodiments in which a reliability threshold is set for the prediction, the predicted outcome may be undetermined because the largest output value does not meet the threshold. Once the predicted outcome has been generated, the SVM models module reports the result back to the outcome prediction module in Operation 1030.

Exemplary Computer Processing Device

Figure 11:
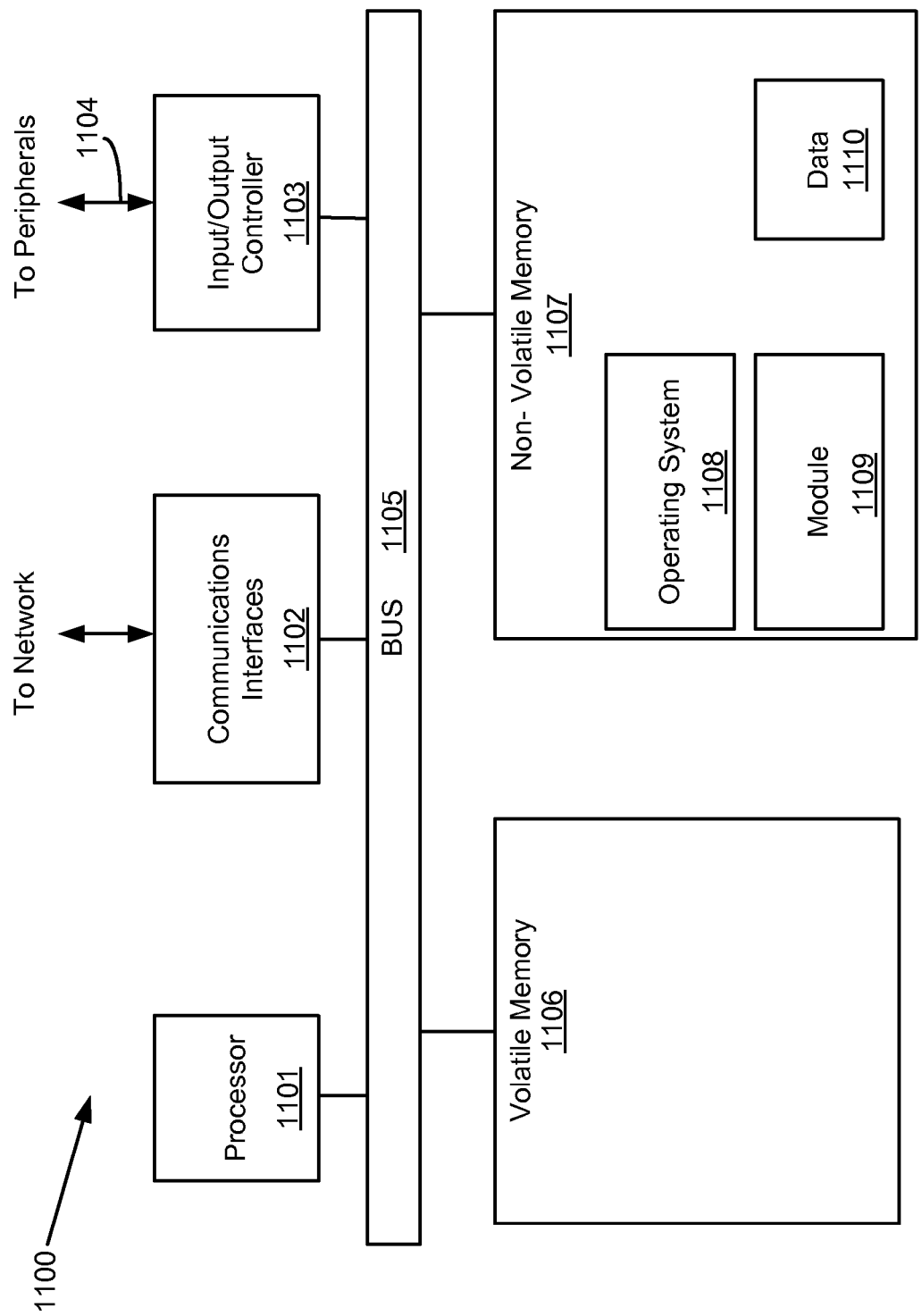
FIG. 11 illustrates an embodiment of a processing device for practicing various technologies and concepts disclosed herein.

FIG. 11 is an exemplary schematic diagram of a computer processing system that may be used in embodiments of various architectures, such as architecture 100 shown in FIG. 1, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 11, the processing system 1100 may include one or more processors 1110 that may communicate with other elements within the processing system 1100 via a bus 1105. The processor 1101 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1100 may also include one or more communications interfaces 1102 for communicating data via a network 170 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1103 may also communicate with one or more input devices or peripherals using an interface such as, but not limited to: a keyboard, a mouse, a touch screen/display input, microphone, pointing device, etc. The input/output controller 1103 may also communicate with output devices or peripherals, such as displays, printers, speakers, headsets, banner displays, etc.

The processor 1101 may be configured to execute instructions stored in volatile memory 1106, non-volatile memory 1107, or other forms of computer readable storage media accessible to the processor 1101. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1107 may store program code and data, which also may be loaded into the volatile memory 1106 at execution time. For example, the non-volatile memory 1107 may store one or more modules 1109 that may perform the above-mentioned process flows and/or operating system code 1108 containing instructions for performing the process and/or functions associated with the technologies disclosed herein. The module(s) 1109 may also access, generate, or store related data 1111, including, for example, the data described above in conjunction with predicted outcomes for events of interest, in the non-volatile memory 1107, as well as in the volatile memory 1106. The volatile memory 1106 and/or non-volatile memory 1107 may be used to store other information including, but not limited to: records, applications, programs, scripts, source code, object code, byte code, compiled code, interpreted code, machine code, executable instructions, or the like. These may be executed or processed by, for example, the processor 1110 and may form a part of, or may interact with, the module(s) 1109.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for determining whether to conduct a follow-up communication with a party based on predicting an outcome for the follow-up communication with the party, the method comprising the steps of:
   receiving a voice sample of a first communication conducted with the party in which the party is speaking about an event of interest;
   extracting one or more voice characteristics from the voice sample by at least one computer processor;
   applying at least a first classifier model to the one or more voice characteristics by the at least one computer processor to provide a first predicted outcome of whether the follow-up communication with the party will result in the event of interest occurring;
   performing analytics on the voice sample by the at least one computer processor to detect a set of words being spoken by the party in the voice sample;
   applying at least a second classifier model to the set of words by the at least one computer processor to provide a second predicted outcome of whether the follow-up communication with the party will result in the event of interest occurring;
   determining by the at least one computer processor whether the first predicted outcome and the second predicted outcome match;
   in response to the first predicted outcome and the second predicted outcome matching, predicting the outcome to the follow-up communication with the party as being the first predicted outcome;
   in response to the first predicted outcome and the second predicted outcome not matching, predicting the outcome to the follow-up communication with the party as being (1) the first predicted outcome if the first classifier model is historically more accurate than the second classifier model at providing predicted outcomes or (2) the second predicted outcome if the second classifier model is historically more accurate than the first classifier model at providing predicted outcomes; and
   conducting the follow-up communication with the party in response to predicting the outcome to the follow-up communication with the party will result in the event of interest occurring.

2. The method of claim 1, wherein the first communication is conducted between the party and a contact center agent.

3. The method of claim 1, wherein the follow-up communication has more than two possible outcomes and the first classifier model is one of a first set of classifier models comprising a classifier model for predicting each possible outcome based on the voice characteristics and the second classifier model is one of a second set of classifier models comprising a classifier model for predicting each possible outcome based on the set of words.

4. The method of claim 1, wherein the voice characteristics comprise one or more of accent shape, average pitch, contour slope, final lowering, pitch range, speech rate, stress frequency, breathiness, brilliance, loudness, pause discontinuity, and pitch discontinuity.

5. The method of claim 1, wherein the first classifier model and the second classifier model are support vector machines.

6. The method of claim 1, wherein extracting the voice characteristics from the voice sample involves:
   normalizing the voice sample to eliminate speaker and recording variability; and
   applying one or more digital signal processing methods to extract the voice characteristics.

7. The method of claim 1 further comprising the steps of, prior to applying the second classifier model to the set of words:
   performing lemmatization on the set of words to map inflected words in the set of words to lemma forms;
   eliminating common words from the set of words, the common words comprising words that solely fulfill a grammatical function as opposed to a content function that carries meaning; and
   determining a frequency of occurrence of each remaining word in the set of words following the elimination of the common words, wherein at least one of the frequencies of occurrence is provided as an input to the second classifier model.

8. A non-transitory, computer-readable storage medium comprising computer-executable instructions for determining whether to conduct a follow-up communication with a party based on predicting an outcome for the follow-up communication with the party that when executed by at least one computer processor are configured to cause the at least one computer processor to:
   receive a voice sample of a first communication conducted with the party in which the party is speaking about an event of interest;
   extract one or more voice characteristics from the voice sample;
   apply at least a first classifier model to the one or more voice characteristics to provide a first predicted outcome of whether the follow-up communication with the party will result in the event of interest occurring;
   perform analytics on the voice sample to detect a set of words being spoken by the party in the voice sample;
   apply at least a second classifier model to the set of words to provide a second predicted outcome of whether the follow-up communication with the party will result in the event of interest occurring;
   determine whether the first predicted outcome and the second predicted outcome match;
   in response to the first predicted outcome and the second predicted outcome matching, predict the outcome to the follow-up communication with the party as being the first predicted outcome;
   in response to the first predicted outcome and the second predicted outcome not matching, predict the outcome to the follow-up communication with the party as being (1) the first predicted outcome if the first classifier model is historically more accurate than the second classifier model at providing predicted outcomes or (2) the second predicted outcome if the second classifier model is historically more accurate than the first classifier model at providing predicted outcomes; and
   initiate having the follow-up communication conducted with the party in response to predicting the outcome to the follow-up communication with the party will result in the event of interest occurring.

9. The non-transitory, computer-readable storage medium of claim 8, wherein the first communication is conducted between the party and a contact center agent.

10. The non-transitory, computer-readable storage medium of claim 8, wherein the follow-up communication has more than two possible outcomes and the first classifier model is one of a first set of classifier models comprising a classifier model for predicting each possible outcome based on the voice characteristics and the second classifier model is one of a second set of classifier models comprising a classifier model for predicting each possible outcome based on the set of words.

11. The non-transitory, computer-readable storage medium of claim 8, wherein the voice characteristics comprise one or more of accent shape, average pitch, contour slope, final lowering, pitch range, speech rate, stress frequency, breathiness, brilliance, loudness, pause discontinuity, and pitch discontinuity.

12. The non-transitory, computer-readable storage medium of claim 8, wherein the first classifier model and the second classifier model are support vector machines.

13. The non-transitory, computer-readable storage medium of claim 8, wherein the computer-executable instructions are further configured, when executed, to cause the at least one computer processor to:
normalize the voice sample to eliminate speaker and recording variability; and
apply one or more digital signal processing methods to extract the voice characteristics.

14. The non-transitory, computer-readable storage medium of claim 8, wherein the computer-executable instructions are further configured, when executed, to cause the at least one computer processor to extract the voice characteristics from the voice sample prior to applying the second classifier model to the set of words by:
performing lemmatization on the set of words to map inflected words in the set of words to lemma forms;
eliminating common words from the set of words, the common words comprising words that solely fulfill a grammatical function as opposed to a content function that carries meaning; and
determining a frequency of occurrence of each remaining word in the set of words following the elimination of the common words, wherein at least one of the frequencies of occurrence is provided as an input to the second classifier model.

15. A system for determining whether to conduct a follow-up communication with a party based on predicting an outcome for the follow-up communication with the party, the system comprising:
At least one computer processor configured to:
receive a voice sample of a first communication conducted with the party in which the party is speaking about an event of interest;
extract one or more voice characteristics from the voice sample;
apply at least a first classifier model to the one or more voice characteristics to provide a first predicted outcome of whether the follow-up communication with the party will result in the event of interest occurring;
perform analytics on the voice sample to detect a set of words being spoken by the party in the voice sample;
apply at least a second classifier model to the set of words to provide a second predicted outcome of whether the follow-up communication with the party will result in the event of interest occurring;
determine whether the first predicted outcome and the second predicted outcome match;
in response to the first predicted outcome and the second predicted outcome matching, predict the outcome to the follow-up communication with the party as being the first predicted outcome;
in response to the first predicted outcome and the second predicted outcome not matching, predict the outcome to the follow-up communication with the party as being (1) the first predicted outcome if the first classifier model is historically more accurate than the second classifier model at providing predicted outcomes or (2) the second predicted outcome if the second classifier model is historically more accurate than the first classifier model at providing predicted outcomes; and
initiate having the follow-up communication conducted with the party in response to predicting the outcome to the follow-up communication with the party will result in the event of interest occurring.

16. The system of claim 15, wherein the first communication is conducted between the party and a contact center agent.

17. The system of claim 15, wherein the follow-up communication has more than two possible outcomes and the first classifier model is one of a first set of classifier models comprising a classifier model for predicting each possible outcome based on the voice characteristics and the second classifier model is one of a second set of classifier models comprising a classifier model for predicting each possible outcome based on the set of words.

18. The system of claim 15, wherein the voice characteristics comprise one or more of accent shape, average pitch, contour slope, final lowering, pitch range, speech rate, stress frequency, breathiness, brilliance, loudness, pause discontinuity, and pitch discontinuity.

19. The system of claim 15, wherein the first classifier model and the second classifier model are support vector machines.

20. The system of claim 15, wherein the at least one computer processor is further configured to:
normalize the voice sample to eliminate speaker and recording variability; and
apply one or more digital signal processing methods to extract the voice characteristics.

21. The system of claim 15, wherein at least one computer processor is configured to extract the voice characteristics from the voice sample prior to applying the second classifier model to the set of words by:
performing lemmatization on the set of words to map inflected words in the set of words to lemma forms;
eliminating common words from the set of words, the common words comprising words that solely fulfill a grammatical function as opposed to a content function that carries meaning; and
determining a frequency of occurrence of each remaining word in the set of words following the elimination of the common words, wherein at least one of the frequencies of occurrence is provided as an input to the second classifier model.

* * * * *